(12) United States Patent
Shaburov

(10) Patent No.: US 7,366,723 B2
(45) Date of Patent: Apr. 29, 2008

(54) VISUAL QUERY MODELING FOR CONFIGURABLE PATTERNS

(75) Inventor: Victor V. Shaburov, Leimen (DE)

(73) Assignee: SAP AG, Walldorf (DE)

( * ) Notice: Subject to any disclaimer, the term of this patent is extended or adjusted under 35 U.S.C. 154(b) by 570 days.

(21) Appl. No.: 10/959,244

(22) Filed: Oct. 5, 2004

(65) Prior Publication Data

US 2006/0074967 A1 Apr. 6, 2006

(51) Int. Cl.
*G06F 17/30* (2006.01)

(52) U.S. Cl. .............................. 707/10; 707/3; 345/621

(58) Field of Classification Search .................... 707/3, 707/6, 10, 104.1; 345/619, 621
See application file for complete search history.

(56) References Cited

U.S. PATENT DOCUMENTS

| | | | |
|---|---|---|---|
| 5,627,979 A | * | 5/1997 | Chang et al. ............... 715/763 |
| 5,988,862 A | * | 11/1999 | Kacyra et al. ................. 703/6 |
| 5,999,940 A | * | 12/1999 | Ranger .................... 707/103 R |
| 6,212,672 B1 | * | 4/2001 | Keller et al. ................. 717/104 |
| 6,915,301 B2 | * | 7/2005 | Hirsch ........................ 707/102 |

OTHER PUBLICATIONS

WindowsITPro, "Visual Studio .NET Database Features," Feb. 2002, 3 pages, http://www.winnetmag.com/SOLServer/Article/ArticleID/23364/23364.html.
Oracle Technology Network, "Oracle Jdeveloper 10g New Features," Apr. 2004, 6 pages, http://www.oracle.com/technology/products/jdev/collateral/jdev10g_fo.html.

* cited by examiner

*Primary Examiner*—Leslie Wong
(74) *Attorney, Agent, or Firm*—Finnegan, Henderson, Farabow, Garrett & Dunner LLP

(57) ABSTRACT

Methods, systems, and computer program products, implementing techniques for visual query modeling. In one aspect, the techniques include displaying in a web browser a visual model of a database, the visual model including one or more graphical objects representing one or more tables in the database and relations between the tables, receiving in the web browser user input creating a visual model of a query into the database, and generating code for the query based on the visual model of the query.

15 Claims, 34 Drawing Sheets

FIG. 1

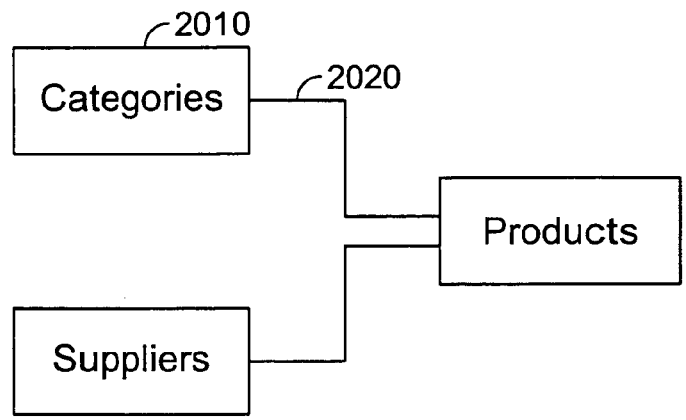
FIG. 20
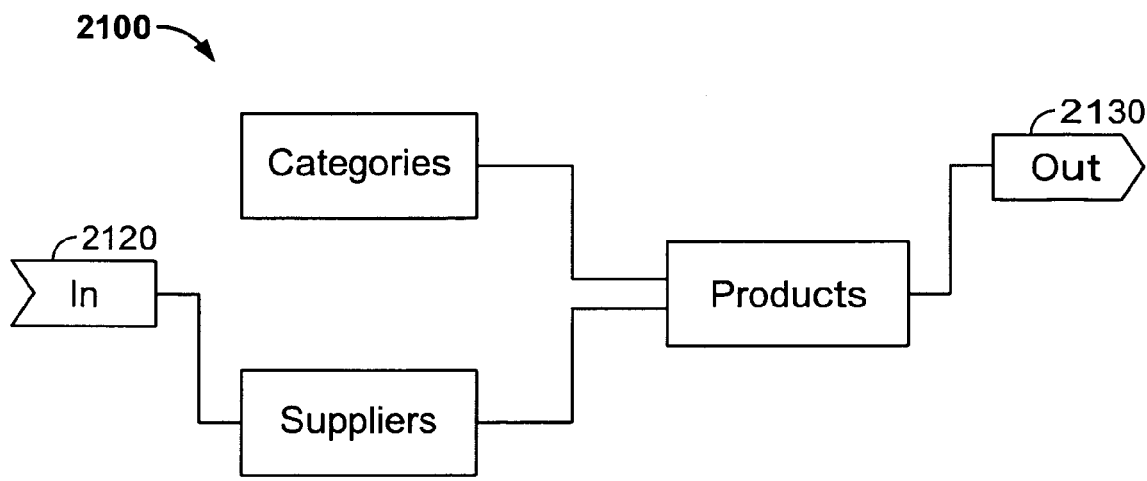
FIG. 21A
2110 { SELECT   *
       FROM     Products
       WHERE    Products.SupplierID=Suppliers.SupplierID and [Suppliers=?]
FIG. 21B

FIG. 24

VISUAL QUERY MODELING FOR CONFIGURABLE PATTERNS

BACKGROUND

The present invention relates to data processing by a computing device, and more particularly to developing applications using configurable patterns and visual query modeling for configurable patterns.

A user interface (UI) facilitates interaction between humans and computers by inviting and responding to user input. User interfaces come in many varieties, and are designed to work in concert with application programs. Application programs, sometimes referred to simply as applications, are programs that an end-user runs to accomplish certain tasks. Applications typically work in conjunction with one or more back-end systems, which store the data to be worked on (e.g., business objects and other business data), as well as logic for manipulating the data (e.g., transactions or other business logic). Examples of back-end systems include database systems, enterprise resource planning (ERP) systems, and customer relationship management (CRM) systems.

A common scenario involving user interfaces is a network application, where a network connects an application program running on a server and one or more user interfaces displayed in client programs running on client devices. The client/server relationship is one in which a server provides services to the client devices. Both the client devices and the server typically have a network interface for accessing networks such as a local area network (LAN), a wide area network (WAN), or the Internet.

In a network environment, a common client device is a personal computer, and a common client program is a Web browser. The client program, which displays a user interface for an application running on a server, enables networked communication between the client device and the server using a data transfer protocol (e.g., the Hypertext Transfer Protocol (HTTP)) to exchange files, images, programs, and/or application data. HTTP is a request/response-type protocol that specifies how the client device and the server communicate with each other. The server may receive a request from the client device using HTTP, respond to the request, and then close the connection. HTTP is a stateless protocol, meaning that each time a client device requests a Web page, the server will respond to the request independently of any previous requests from the client device, and without recording the request.

The information transmitted from the server and intended for display by the client program on the client device may be described with Hypertext Markup Language (HTML) code or Extensible Markup Language (XML) code. HTML is a language that is used to describe the structure of a document, such as a Web page. Client programs interpret HTML code to determine how to display the information contained in the page. A user may request a Web page from a server by clicking on a hyperlink or specifying a Uniform Resource Locator (URL) string. A URL can be used to identify the address of a file or Web page that may be accessed on a network. The address identifies the Web server on which the file or Web page is stored and the directory in which the item is located. When the server receiving the URL request finds a sought Web page, the server sends the page to the client device so that the client device can use that Web page, for example, by generating a display for a user according to the Web page.

An application usually implements the functionality required to display and execute one or more user interfaces for the application. For this reason, an application is sometimes referred to as a user interface application. In some cases, part of the user interface functionality (e.g., rendering) may be handled by a client program that interacts with the application. Whether or not this can occur depends on the capabilities of the client program.

Companies typically use many applications in the course of their businesses. For example, they may use one application for sales and a different application for inventory management. Typically each application is accessed through a separate user interface.

Recently, companies have started to unify their applications so that they can be accessed through a single interface, in some cases referred to as a portal. However, many companies who have a portal also have legacy applications that cannot be accessed through the portal. Migrating these legacy applications so that they can be executed in a portal environment often requires rewriting the application code, a process that can take several weeks.

SUMMARY OF THE INVENTION

Methods, systems, and computer program products, implementing techniques for visual query modeling. In one aspect, the techniques include displaying in a web browser a visual model of a database, the visual model including one or more graphical objects representing one or more tables in the database and relations between the tables, receiving in the web browser user input creating a visual model of a query into the database, and generating code for the query based on the visual model of the query.

The techniques can be implemented to include one or more of the following features.

The code is SQL (Structured Query Language) code.

The user input creating a visual model of a query includes input specifying a query structure, query inputs and query outputs.

The techniques further comprise incorporating the query into a pattern-based application, the pattern-based application being an application that is developed by selecting a pattern from a set of patterns and configuring the pattern to perform application-specific functionality, the pattern comprising multiple pattern elements including prearranged user interface elements, the pattern specifying predefined actions that can be performed using the user interface elements. Incorporating the query into a pattern-based application includes configuring the pattern to use the query.

The query takes as input one or more input fields and produces as a output one or more output fields; and configuring the pattern to use the query includes selecting which input fields and output fields to be displayed by the pattern.

Configuring the pattern to use the query includes adapting the query to include one or more additional output fields selected based on the relations in the database.

Configuring the pattern to use the query includes configuring the pattern to perform one or more data operations on the output of the query.

Automatically generating one or more additional queries based on the selected pattern.

The techniques can be implemented to realize one or more of the following advantages.

The query modeler is accessible on-line, for example, through a web browser, without the installation of any client code.

Queries can be modeled very quickly, in a declarative way, without any coding. Queries can be created visually. The developer does not need to learn a query language in order to create queries.

The modeled queries can be used to configure patterns. Queries can be generated automatically based on patterns.

One implementation of the invention provides all of the above advantages.

Details of one or more embodiments of the invention are set forth in the accompanying drawings and in the description below. Other features, objects, and advantages of the invention will be apparent from the description, the drawings, and the claims.

BRIEF DESCRIPTION OF THE DRAWINGS

FIG. 1 is a screenshot of a user interface.

FIG. 20 illustrates a visual model of a database.

FIGS. 21A-B illustrate a visual model of a query and a query statement corresponding to the visual model.

FIGS. 24-30 illustrate an example migration.

Like reference numbers and designations in the various drawings indicate like elements.

DETAILED DESCRIPTION

Overview of UI Patterns

Figure 1:
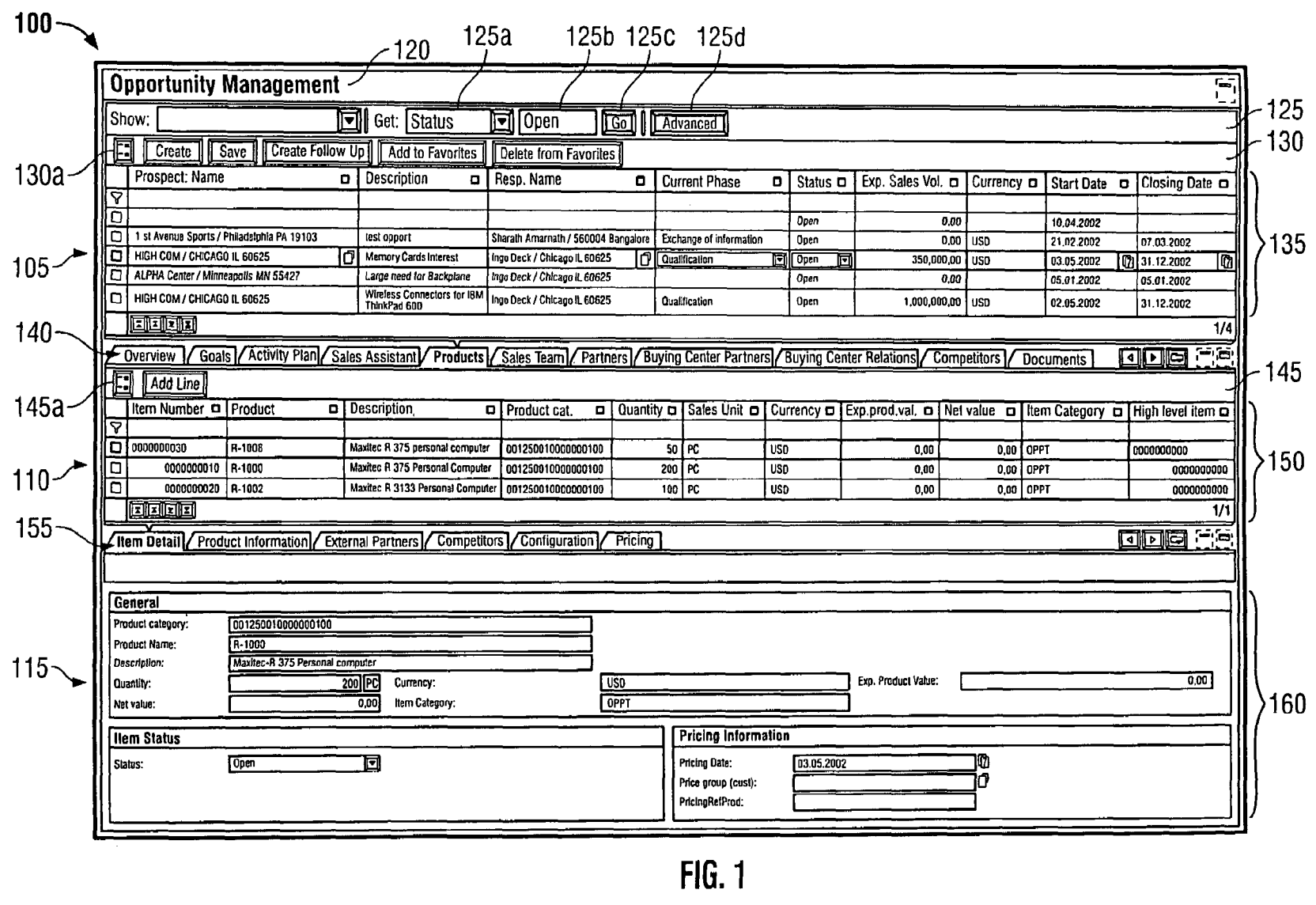
Figure 2:
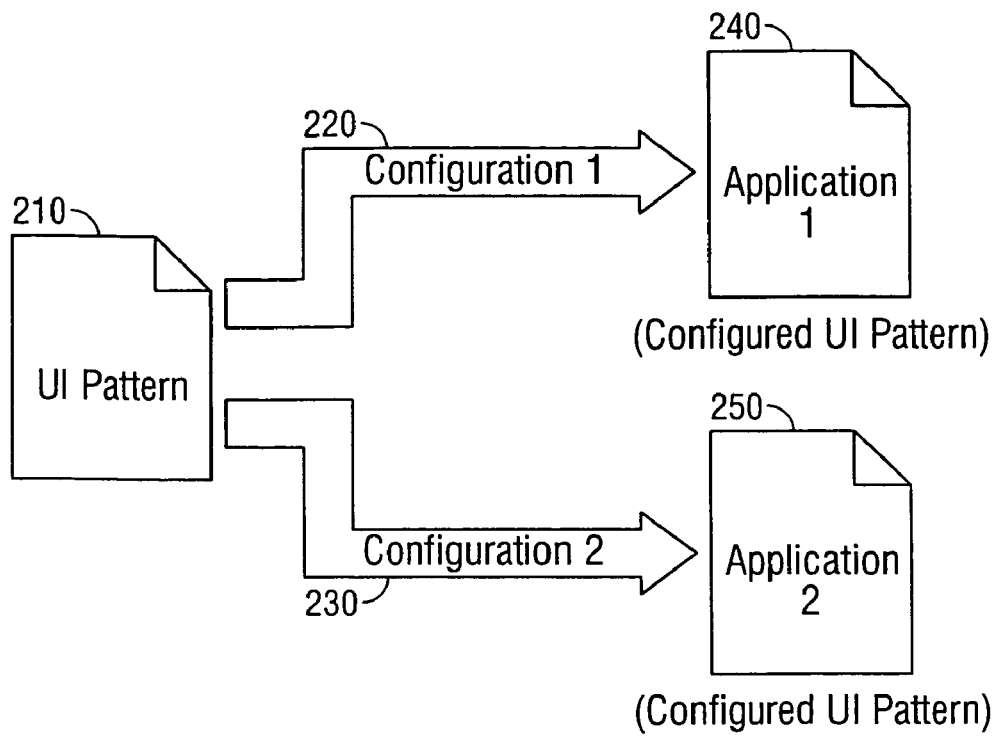
FIG. 2 is a block diagram illustrating the configuration of a UI pattern.

FIG. 1 illustrates a screenshot of a user interface 100. User interfaces typically contain various UI elements, including controls (e.g., drop down element 125a, text box element 125b, or button element 125c) and data elements (e.g., content area 135), arranged into application screens or views. The design of a user interface, including the layout of the UI elements and the navigation between the UI elements and between the views, is usually left up to the application developer. Thus, if the task of developing the same application is given to a number of application developers, each developer may design a different user interface for that application. Although each version of the application implements the same functionality, the user interfaces may be significantly different from each other.

A more constrained and structured approach to developing user interfaces is to build them using user interface patterns. A UI pattern (sometimes referred to simply as a pattern) is a configurable, reusable user interface unit designed to let users accomplish a specific but generically-defined task, such as searching for business objects, and editing the objects that are retrieved. Generally, each UI pattern has a specific semantic meaning and defined interaction behavior. In one implementation, each UI pattern includes a predefined arrangement of UI elements. Using UI patterns promotes uniform design throughout an application or group of applications because similar tasks are represented and handled in the same manner. For example, a user can always search in the same way, whether searching for a sales order, a business partner, or a product.

UI patterns can be defined at various levels, and can be nested within each other, thus creating hierarchies of patterns. At the top level of the hierarchy, a pattern can act as a "floor plan" for a user interface that is designed to help end-users complete a specific business process. The floor plan defines the user interface by specifying an overall screen layout for the user interface and managing and orchestrating any nested patterns.

One example of an important business process is working with business documents. A business document (e.g., a sales order or an invoice) is a high-level business object that can contain references to other business objects (e.g., objects corresponding to the items in a sales order and to the customer that placed the sales order). The process of working with business documents typically involves finding an existing business document or creating a new business document, and then displaying and editing the document. To help a user accomplish these tasks, an application should include a user interface that assists the user in locating the business document to be edited, and then presents the logical parts of the business document (e.g., the referenced objects that contain the customer data and the sales order items) in a clear and structured manner. The user interface should display the relevant data in an appropriate format for the given context (e.g., in a table, a form, or a chart). The user interface should also provide input help where applicable, and supply application documentation if needed. After the user has finished editing the business document (including objects referenced by the document), the user interface should also help the user carry out post-editing tasks, such as printing out the business document, and performing document lifecycle actions (e.g., saving, deleting, creating, or updating).

An example floor plan for such a user interface can specify that an application screen is to be divided into three sections, with a top section for searching for and selecting business objects, a middle section for showing the details of an object selected in the top section, and a bottom section for showing the details of a sub-object of the object in the middle section.

More detailed, lower-level patterns can be used for each of the sections specified in a floor plan. For example, an object identification pattern (OIP) can be used for the top section in the floor plan specified above. An OIP pattern (an example of which is provided below), can specify, for instance, that a section of the screen is to include a search bar with various text entry fields and buttons at the top, and an area below the search bar where content (i.e., the content returned as a result of a search) is to be displayed.

This process can continue with the definition and hierarchical nesting of even lower-level patterns. For example, the OIP pattern above can specify that the content display area is to include a table control for displaying the results of a search. The table control can be a complex control that lets users perform tasks such as selecting and sorting rows in the table, and editing entries directly in the table. In this scenario, the table control itself can be thought of as a low-level pattern.

The user interface 100 shown in FIG. 1 illustrates an example of a pattern-based user interface. The user interface 100 has a floor plan that includes an object identification pattern (OIP) 105 and two object data patterns (ODPs) 110 and 115. As described below, object identification pattern 105 and object data patterns 110 and 115 are made up of embedded lower-level patterns, such as a data view, a form pane, a list pane, or a chart pane. Each embedded pattern can include further embedded patterns, including, for example, tool bars, tables, tab strips, and other UI pattern elements.

Object identification pattern 105 is a pattern that provides an interface for searching for objects (using zero or more selected criteria), and for displaying objects found to meet those criteria. Like the floor plan pattern, OIP 105 is itself a pattern with several embedded elements. Object identification pattern 105 includes a title bar 120, a search bar 125, a tool bar 130, and a content area 135.

Title bar 120 orients the user. Search bar 125 enables the user to enter zero or more search criteria to locate objects of interest. For example, search bar 125 includes a drop down element 125a that lists the fields for which the user can enter a search term. Drop down element 125a illustrated in FIG. 1 shows that the user has selected the field "Status" for searching. Search bar 125 also includes a text box element 125b that allows a user to enter a search term to identify the objects of interest. Text box element 125b illustrated in FIG. 1 shows that the user has entered "Open" as the value to find in the "Status" field. Search bar 125 also includes a "Go" button element 125c that initiates the search based on user input in elements 125a and 125b. With the word "Get" located in front of drop down element 125a, search bar 125 reads "Get Status Open Go", which provides a reusable and intuitively understandable mechanism for initiating user searches.

Search bar 125 also includes an "Advanced" button element 125d that allows a user to initiate an advanced search. Upon pushing button 125d, a form pane is rendered between search bar 125 and tool bar 130. The form pane can include, for example, each of the fields that are in drop down element 125a, and a text box besides each field. Thus, the user can enter search terms for multiple fields to create more focused searches, thereby limiting the number of objects that appear in content area 135.

Tool bar 130 provides functions that the user can perform on the objects displayed in the content area 135, such as create, save, and add to and delete from the user's list of favorite objects. Tool bar 130 also includes a toggle control 130a that allows a user to toggle the layout of content area 135 between different types of panes that provide different representations of the objects retrieved by a search. For example, a list pane displays a tabular representation of the objects (as illustrated in FIG. 1). A form pane displays the object that is currently selected, with each field in the object having a control (e.g., a text box, a pull down menu, or a check box) to enable a user to change data associated with that field. As another example, a chart pane can display a graphical representation of the retrieved data. Panes can be developed to meet specific needs, and can be integrated as low-level patterns into high-level patterns such as OIPs and ODPs.

As indicated above, content area 135 displays those objects that meet the search criteria specified by the user. Selecting an object in content area 135 determines what is displayed in object data pattern (ODP) 110. ODP 110 is a pattern that displays detail data associated with the selected object from content area 135. ODP 110 includes a tab bar 140, a tool bar 145, and a content area 150. Tab bar 140 selects the type of data that is displayed in content area 150. FIG. 1 depicts the "Products" tab as having been selected, so the data in content area 150 corresponds to product data (e.g., a list of products with item numbers, product descriptions, quantities, and the like) associated with the object selected in content area 135. Tool bar 145 includes a toggle button 145a that allows a user to toggle the layout of content area 150 between a list pane (as currently illustrated in FIG. 1) and another type of pane (e.g., a form pane or a chart pane).

Selecting an object in content area 150 determines what is displayed in object data pattern (ODP) 115. ODP 115 is a pattern that displays detail data associated with the selected object from content area 150. ODP 115 includes a tab bar 155 and a content area 160. Tab bar 155 selects the type of data that is displayed in content area 160. FIG. 1 depicts the "Item Detail" tab as selected, so the data in content area 160 corresponds to item detail data (e.g., a form pane with item details such as product description, quantity, net value, status, and the like) associated with the object selected in content area 150.

As an example of a different floor plan, ODP 115 can be replaced with a guided data entry pattern (GDP). A GDP is a pattern that guides the user through a sequence of operations in a task. A GDP can contain an operation bar and a data entry area, similar to tab strip 155 and content area 160 of ODP 115. The operation bar of the GDP however, represents the operations of the guided process. For example, using tab strip 155 for illustration, the "Item Detail" tab would be a "Step 1" tab, the "Product Information" tab would be a "Step 2" tab and so on. In execution, the GDP would start on the "Step 1" tab and display in the data entry area the fields that the user must enter for the first operation of the process. When the user clicks on the "Step 2" tab, the data entry area would change for the second operation of the process. In one implementation of a GDP, the user is not permitted to perform operations out of sequence (e.g., to go from the "Step 1" tab to the "Step 3" tab), or to proceed to the next operation until the current operation is completed (e.g., the user is not allowed to select a subsequent tab or enter data for a subsequent tab until data entry for the current tab is complete). In another implementation, whether or not the user is allowed to perform operations out of sequence is left as a choice for the application developer to specify as part of a configuration for a GDP.

The UI patterns described above and in the remainder of this application (e.g., OIPs, ODPs, and GDPs) are meant to serve only as illustrative, concrete examples of patterns. Patterns can be created to let users accomplish any generically-defined task, and the concepts and techniques described in this application apply to and can be used with all such patterns, and are not to be restricted to the example patterns discussed herein.

Configuring UI Patterns

User interface 100 of FIG. 1 illustrates a particular application that is based on the patterns described above. Such an application will be referred to as a pattern-based application, a pattern application, or simply an application. As explained above, UI patterns are reusable user interface units designed for generic tasks—for example, an OIP pattern is designed for the task of searching for and selecting business objects stored in a back-end system (e.g., a database). In order to create a concrete user interface (e.g., user interface 100 with OIP 105), UI patterns need to be configured. FIG. 2 illustrates an example in which a UI pattern 210 is configured (shown using arrows 220 and 230) to create two UI applications 240 and 250. Configuration one 220 is used to create application one 240, and configuration two 230 is used to create application two 250.

Configuration is the process through which a UI pattern is developed into an actual user interface (or portion thereof) for an actual application. For illustrative purposes, this might be compared to instantiating an object of a specified class—the UI pattern (comparable to a class) specifies the general properties of a portion of a user interface, and a configured pattern (comparable to an instantiated object) specifies the actual properties of the portion of the user interface for an actual application. UI pattern 210 represents the general properties of the UI portion—for example, that a table is included in that UI portion, and that the location of the table is under a title bar. Configuration one 220 represents the process of specifying the specifics of the UI portion (for example, the specific columns that will be included in the table when the table is rendered), so as to create an application (for example, application one 240) that displays a UI with a table under the title bar with specific columns defined by configuration one 220. Similarly, application two 250 displays a table, but with specific columns as defined by configuration two 230.

A configuration can also specify what back-end systems and data are to be used for a pattern. For example, configuration one 220 can specify a particular back-end system (e.g., a local or remote database system) and a particular service to use to access the data on that back-end system that is to be displayed in the table in the UI pattern 210. Examples of services that can be used to access a host system include web services, Enterprise Java Beans (EJBs), Business Application Programming Interfaces (BAPIs) developed by SAP AG of Walldorf (Baden), Germany (SAP), and other business logic services.

As another example of a configuration, an OIP might specify that a user interface is to include a search bar at the top of the interface and a content area below the search bar. The search bar is to include a drop down box for selecting a search field, a text box for entering a query string, and a "Go" button for executing searches. Configuring such a pattern is the process of providing specifics for the pattern for an actual application. For example, to configure the OIP pattern, an application developer can specify the search fields to be included in the drop down box, the query to run when the "Go" button is pressed, the back-end system in which to run the query (i.e., the system where the actual data is located), and the columns from the returned results to display in the content area.

In some implementations, a UI pattern can have a number of predefined layouts (e.g., a grid layout and a flow layout), and the application developer can decide which of the available layouts to use as part of the configuration process. Moreover, each layout can be further configurable, providing the application developer with further configuration options (e.g., an option to create groupings of fields or other elements). In yet other implementations, a pattern can be defined to have a fully configurable layout, giving the application developer complete freedom to modify the arrangement of the elements in the pattern (e.g., by using a graphical configuration tool to specify screen positions for each element in the patter).

Thus, the degree to which each UI pattern is configurable can vary. For example, the degree to which the arrangement of elements in a pattern can be configured can vary across a spectrum—for some patterns, the arrangement of UI elements can be fully predefined, leaving no configuration options for the application developer; for some patterns, the application developer can be given an option to choose between a handful of predefined arrangements; and for other patterns, the application developer can be given full freedom to define a custom arrangement of elements.

Other pattern properties can also be partially or fully configurable. For example, a developer can be given no options or a few options regarding the actions to be performed by a UI element in a pattern. Or the developer can be allowed to define and associate a custom action with an element in a pattern.

As can be seen from the prior discussion, the term "configuration" can be used in multiple ways. First, "configuration" is the process by which a pattern is developed into a concrete user interface (or portion thereof) for a concrete application. A "configuration" also refers to the data that is produced as a result of the configuration process (i.e., it is the set of data that defines a concrete user interface based on a pattern). Finally, "configuration" can also be used to refer to the set of options provided during the configuration process. As used in this manner, a selected option in a configuration produces a defined item of configuration data.

The use of patterns to develop applications creates two potential levels of re-use. First of all, patterns serve as re-usable building blocks for building user interfaces. For example, an OIP can be used to create two different user interfaces—a first configuration can define a user interface for searching for business objects related to customers (customer objects), and a second configuration can define a second user interface for searching for business objects related to inventory (inventory objects).

In addition, configurations can be reused, meaning that the configurations themselves can serve as re-usable building blocks for building applications. Thus, in the example above, the OIP configuration that defines a user interface for searching for customer objects can be integrated and used in two different applications (e.g., a customer relationship management application and a billing application).

The configuration of a UI pattern can be done either manually (e.g., with a text editor), or through the use of a configuration application. A configuration application facilitates the process of configuring a UI pattern. In one implementation, the configuration application displays multiple configuration options for the application developer to select. As the selections are made, the configuration application displays a WYSIWYG representation of the resulting configured user interface, thereby allowing the application developer to preview his selections and make any necessary modifications. The configuration options can include lists of the available back-end systems, queries, query fields, and query results.

Once the application developer has finished selecting the configuration options, the selections are stored as configuration data for the UI pattern. The configuration data can include associations between one or more of the UI elements in the UI pattern and one or more of the back-end entities to be used with the UI pattern. As an example, configuration data for the OIP described above can include a specification of the back-end system to be used, the query to be run in the back-end system, the query fields to show in the drop down box, and the result fields to display in the content area.

The configuration data can also include customization data for one or more of the UI elements in the UI pattern. The customization data can specify local changes to the business objects associated with the UI elements. For example, a drop-down menu item might be associated with a back-end query field called "UID". The customization data may specify that the "UID" field should be displayed using a more user-friendly label, for example, "reference number". Such a customization applies only to the particular UI element in the particular application being configured, and does not affect how the business object is represented in the back-end system or how the business object is represented by other UI elements in other applications that use the same UI pattern.

The configuration data can be stored in a configuration repository. In one implementation, the configuration data is stored in one or more files. Such files can be nested to reflect a hierarchical arrangement of further UI patterns. The configuration data can then be read by a pattern component, which generates the implementation of the actual user interface for the application based on the configuration data.

Figure 3:
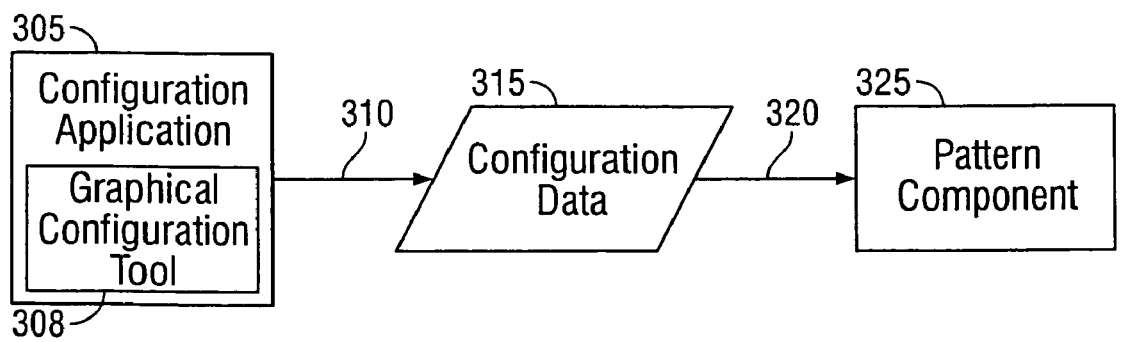
FIG. 3 is a block diagram illustrating the use of a configuration application.

FIG. 3. illustrates the use of a configuration application 305 to create 310 configuration data 315, which is combined 320 with a UI pattern component 325 to produce a pattern-based application. The configuration application 305 generates configuration data 315 that is specific to pattern component 325. That is, the configuration application 305 can ensure that a configuration schema for pattern component 325 is followed.

The generation of a pattern-based application based on a configuration can be done either immediately after the configuration has been completed, or at a subsequent point in time, such as when the pattern-based application is executed.

For example, in the scenario described above where a configuration application produces configuration data for a pattern component, the pattern component can read the configuration data and generate the pattern-based application immediately after the configuration data has been produced. This is referred to as a design-time generation of a pattern-based application, since the generation occurs when the configuration is produced (i.e., when the configured pattern or application is designed).

Alternatively, the pattern component can read the configuration data and generate the implementation of the corresponding pattern-based application when the pattern-based application is executed by an end-user. This is referred to as a run-time or on-demand generation of a pattern-based application. In one implementation, the choice of whether the implementation of a pattern should be generated at design time or at run time is left as an option for the application developer. The use of configuration data to generate an implementation of a pattern (e.g., a configured pattern component) is described in more detail below.

In the illustrated implementation, the configuration application 305 includes a graphical configuration tool 308. Graphical configuration tool 308 can allow a non-technical user, such as an application developer, to visually configure a pattern. The graphical configuration tool can provide an intuitive way in which to configure an application. An example of a graphical configuration tool is discussed in more detail below.

Application Development Framework

Figure 5:
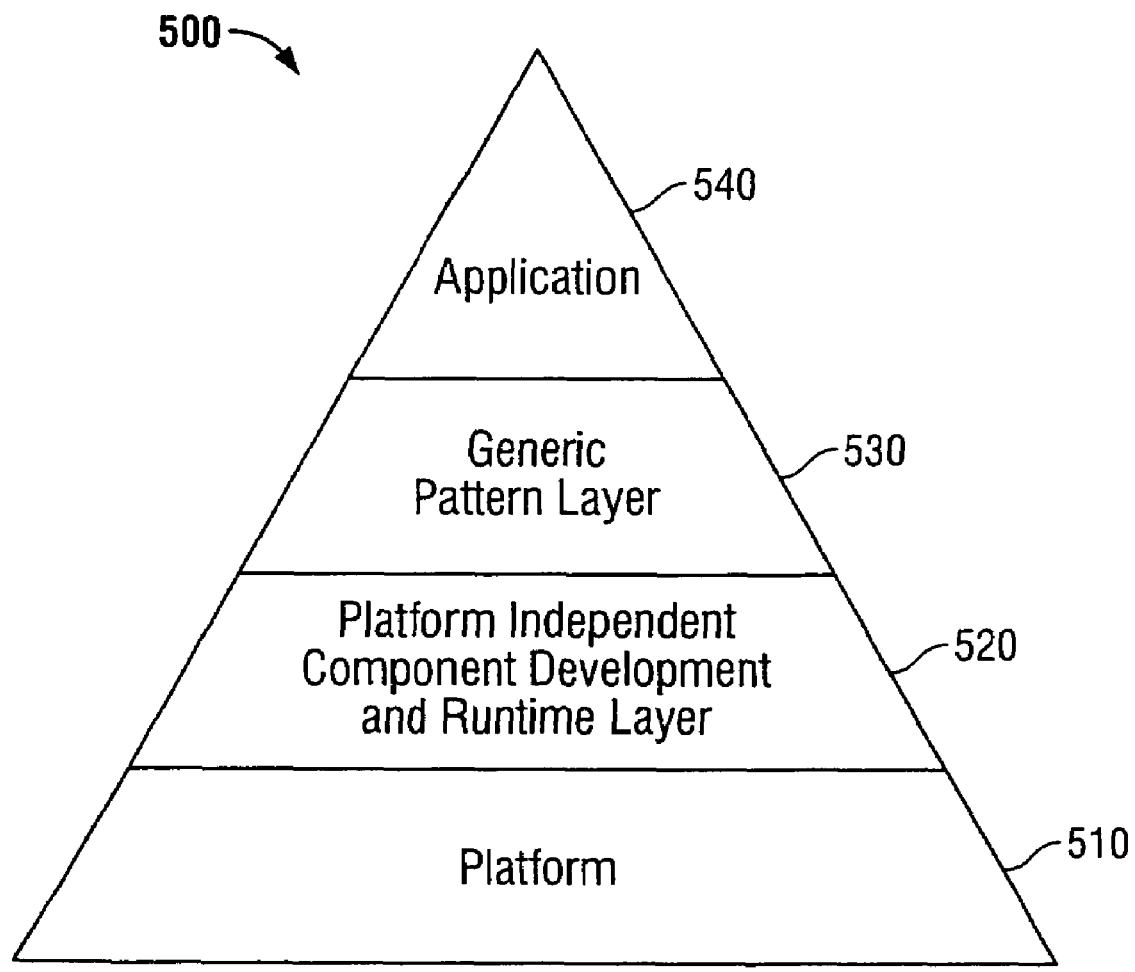
FIG. 5 is a block diagram of a framework for simplifying application development.

FIG. 5. illustrates an example framework 500 for application development based on the configuration of patterns. At the base, framework 500 includes a platform layer 510 on which applications execute. Two example platform layers 510 are the Java 2 Platform, Enterprise Edition (J2EE), manufactured by Sun Microsystems, Inc. of Santa Clara, Calif. and the Advanced Business Application Programming (ABAP)-based platform manufactured by SAP. The platform layer is generally chosen (or already established) by the enterprise that executes the applications.

To enable applications to execute on different platform layers 510, framework 500 includes a platform independent component development and run-time layer 520. In this environment, applications can be developed using modules known as components. Components can be stored in a component repository and reused—that is, each component can have more than one instance, where the component instances are used in multiple applications, or multiple times in the same application. Components can be embedded (nested) within other components, and they can have zero or more visual representations. In one implementation, each component provides three separate interfaces—a programming interface, a data binding interface, and a visual interface. The programming interface can be used by an embedding entity (a component embedder—e.g., a higher level component, or an application) to interact with the embedded component. The visual interface can be used by a component embedder to access and use the visual representations of the embedded component (for example, to form the component embedder's own visual representation). The data binding interface can be used by the component embedder to exchange data with the embedded component.

An example platform independent component development and runtime layer 520 is the Web Dynpro environment manufactured by SAP. The Web Dynpro environment is based on the Web Dynpro programming model, which conforms to the model-view-controller programming paradigm described below with respect to FIGS. 6A and 6B. In one implementation, platform independent layer 520 provides a framework for defining application components in a declarative and/or graphical manner, without needing to program the components for a particular platform layer 510. Platform independent layer 520 also provides interfaces, tools, services, and other features to enable the application components to execute on a specific platform layer 510. In another implementation, platform independent layer 520 additionally provides functionality to enable application components to render user interfaces on a number of different clients, with platform independent layer 520 performing the appropriate transformations for specific clients.

Building on top of platform independent layer 520, framework 500 includes a pattern layer 530 with one or more generic UI patterns. Each UI pattern is generic because it defines a particular pattern (e.g., a floor plan pattern, an OIP, an ODP, a GDP, and the like), but not the specific content that is included for a specific application that uses that pattern. The specific content for a specific application is created by configuring the pattern as described above.

In one implementation, each UI pattern includes a configuration application and a pattern component. The configuration application and the pattern component for each UI pattern can be applications that are developed and executed on the platform independent layer 520 shown in FIG. 5.

Using this approach, the configuration application and the pattern component for each UI pattern can take advantage of the features offered by platform independent layer 520, including, for example, platform independence, client independence, and various functionality offered by platform independent layer 520, such as automatic input help and validation based on declared data types.

Figure 4A:
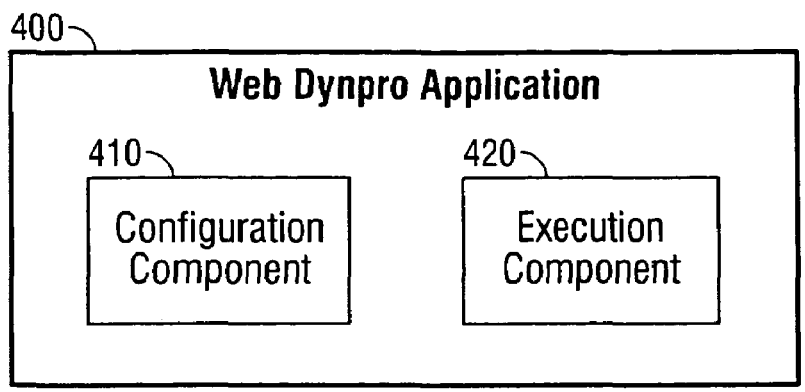
FIGS. 4A-4C illustrate block diagrams of three implementations of a UI pattern.
Figure 4B:
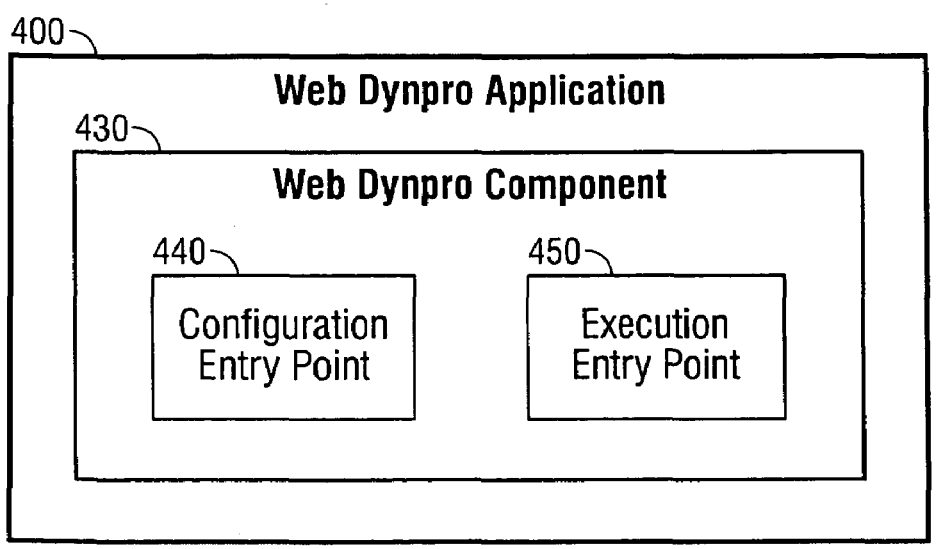

In one implementation, each UI pattern is implemented as a single Web Dynpro application 400, illustrated in FIG. 4A. The single Web Dynpro application has two components, a configuration component 410 that performs the functionality of the configuration application, and an execution component 420 that performs the functionality of the pattern component. Alternatively, as illustrated in FIG. 4B, the Web Dynpro application 400 can be developed using a single component 430 with two entry points—one for configuration 440 and one for execution 450. The application 400 uses a different entry point depending on whether it is being used for configuration or execution of the pattern.

Figure 4C:
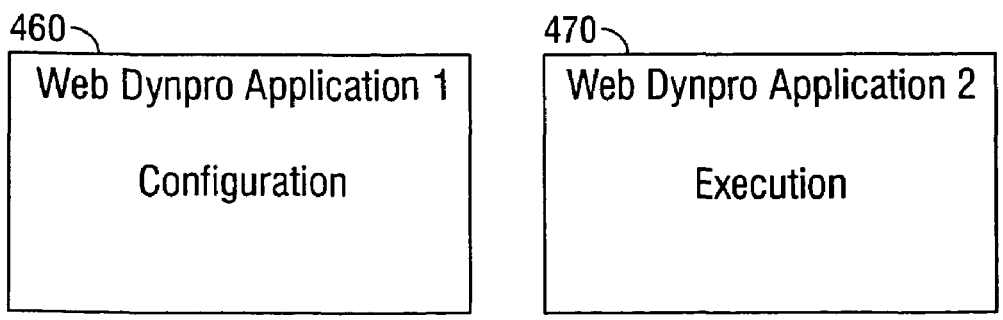

Yet another alternative, illustrated in FIG. 4C, is for each UI pattern to be implemented as two separate Web Dynpro applications—one for configuration 460 and one for execution 470. Each of the two Web Dynpro applications is developed using a separate component (i.e., the configuration application 460 includes a configuration component, and the execution application 470 includes a pattern or execution component).

Referring back to FIG. 5, the top layer, application layer 540, contains the actual applications to be run by end-users. In this framework, an end-user application is made up of one or more configured UI patterns. In an implementation where each UI pattern includes a pattern component, an end-user application is made up of one or more configured pattern components (e.g., pattern components and their corresponding configurations). An end-user application can be stored in a configuration repository in the form of configuration data and references to the associated pattern components.

Framework 500 thus enables application developers to develop applications by configuring generic pattern components into components for specific applications (e.g., components that display the actual fields illustrated in UI 100). In one implementation, as described in more detail below, configuration data (e.g., data in a configuration repository or in one or more configuration files) is used to configure a generic pattern component into a component for a specific application. The configuration data can be defined through the use of declarative and/or graphical tools that are included, for example, in a configuration application, thus dramatically simplifying the task of developing applications. If, for example, the configuration application has access to a meta data repository that specifies the fields available for a particular back-end system for which an application is being developed, the application developer can develop an application (e.g., create a configuration) by simply choosing the fields in the meta data repository to be included (e.g., displayed) in the application.

Framework 500 can be thought of as creating a role-based programming methodology, where layers 510, 520, 530, and 540 correspond to different roles for different developers. Framework 500 is illustrated as a triangle to represent graphically that complexity and difficulty decrease for each role as one moves from the base layer to the top layer. Thus, a developer who is responsible for building and maintaining the platform independent layer 520 has the most complex and difficult job, and must be familiar with the programming languages, tools, and other intricacies of one or more platform layers 510. A developer who is responsible for building and maintaining UI patterns (e.g., configuration applications and pattern components) has a simpler job, as he or she can take advantage of the features and functionality offered by the platform independent layer 520, as described above. Finally an application developer (a developer who is responsible for developing end-user applications) has the least complex job, as he or she can create applications simply by configuring predefined UI patterns. Where the configuration process is as simple as using a configuration application to choose the desired fields from a set of available fields, the application developer may not need to have any advanced programming skills.

Example OIP Pattern Component

Figure 6A:
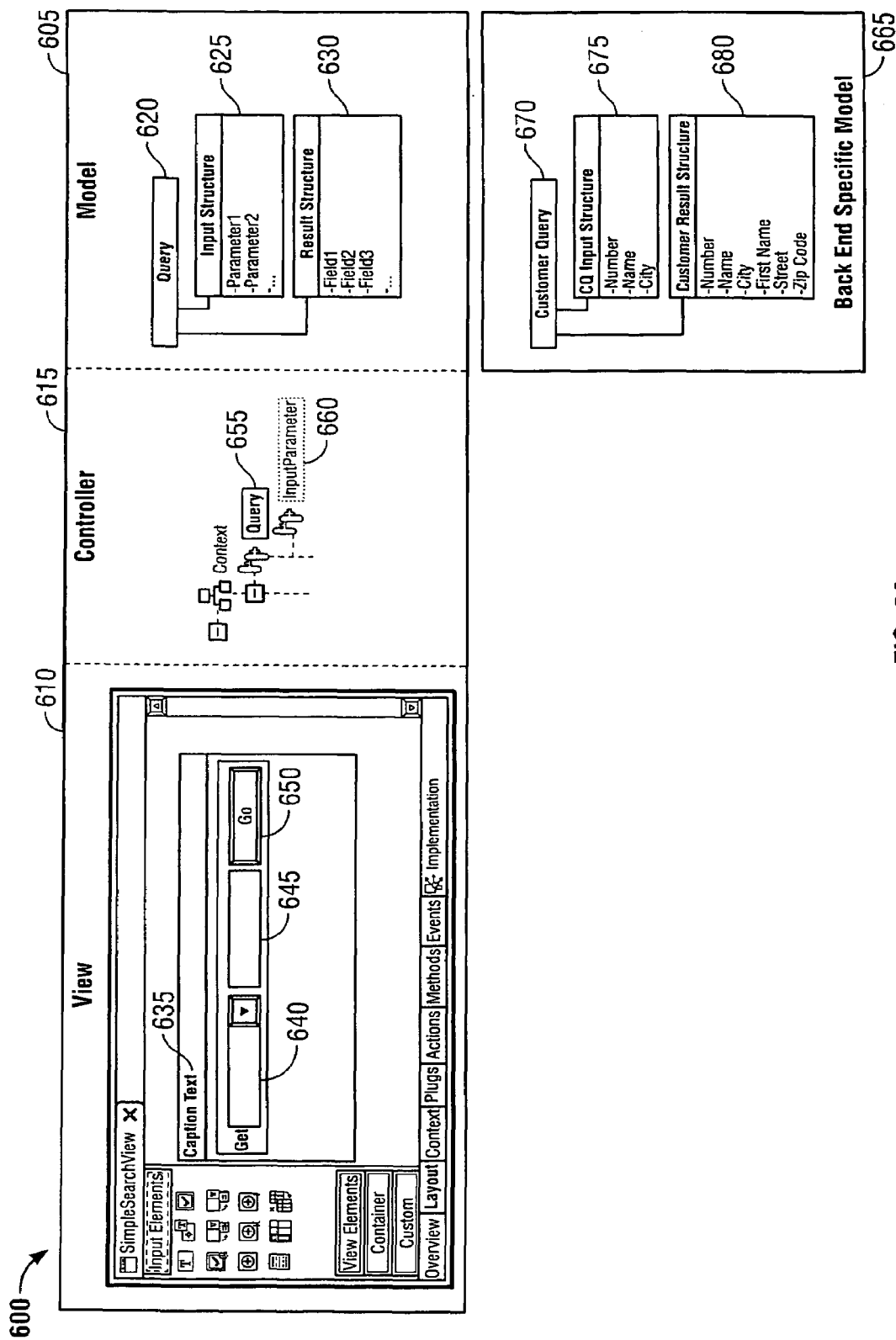
FIGS. 6A-6B are block diagrams of a configurable pattern component for a search pattern.

As described above, an application can be built by configuring a generic pattern component. FIG. 6A illustrates an example of a generic pattern component 600 for an OIP. Component 600 follows a model-view-controller (MVC) paradigm, and as such includes a model 605, a view 610, and a controller 615. In the MVC paradigm, models generally implement application logic. Each model can have multiple views, where each view displays information about the model to a user. A controller of the application receives events, for example, raised by a user interacting with a view to manipulate the model. A model can have multiple controllers. Controllers can relate to zero or more views. Controllers can also relate to an application in general, or to one or more application parts or components. Models and controllers typically include application code. When changes occur in a model, the model can update its views. Data binding can be used for data transport between a view and its model or controller. For example, a table view can be defined to display data from a corresponding table that is stored in a model or controller. The table view is thus bound to the table, indicating that the table is to be used as the data source for the table view. As another example, the table view can be replaced by a further view, such as a linked list, that binds against the same table. In this case, the further view can display the table data without requiring any changes to be made to the controller or the model.

As explained earlier, an OIP can provide an interface to search for and select objects. Accordingly, the model 605 in the OIP component 600 includes a query 620 (e.g., a query class). Because an OIP is a generic UI pattern, query 620 represents a generic query. In one implementation, query 620 includes an input structure 625 of n parameters allowed for queries, and a result structure 630 of m fields returned for each object meeting the search criteria.

View 610 of component 600 defines a user interface with a generic arrangement of UI elements for performing searches. View 610 includes a title bar 635 that displays a caption to orient the user. View 610 also includes a search bar with a drop down element 640 in which the user can select from the available input parameters selected from the input structure 625. The search bar also includes a text entry box 645 in which the user can enter a match criterion for a search, and a "Go" button 650 to initiate the search.

Controller 615 of component 600 binds the UI elements of view 610 (e.g., UI elements 635, 640, and 645) to data elements in a storage area (referred to as a context) that is associated with the controller 615. The context is a structured storage area with hierarchically arranged nodes and attributes. The context associated with the controller 615 includes a query node 655 that includes an input structure 660. The input structure 660 in the controller context corresponds to the input structure 625 in the model 605, and can include up to the n parameters included in the input structure 625.

When the OIP pattern component 600 executes, the component receives configuration data (e.g., from a configuration repository or one or more configuration files), and, based on that configuration data, generates child elements for the input structure context node 660, and binds those elements to elements in the view 610 and the model 605.

As an example, consider an application that allows end-users to search for and retrieve information about a company's customers. To create such an application, a developer can configure an OIP pattern to use a specific back-end system with customer information (e.g., a system represented by back-end specific model 665). Back-end specific model 665 indicates that the back-end system in this example can execute a query called customer query 670 that takes up to three input parameters (a customer number, customer name, and customer city, as specified in the customer query input structure 675), and returns records with six fields (the six fields specified in the customer result structure 680). In an example configuration, an application developer might specify that users should be able to run searches based on any of the three available input parameters (i.e., that all three of the input parameters in the customer query input structure 675 should be listed in the drop down element 640). The developer might further specify that the content display area below the search bar in view 610 should display all six of the available return fields listed in customer result structure 680.

Figure 6B:
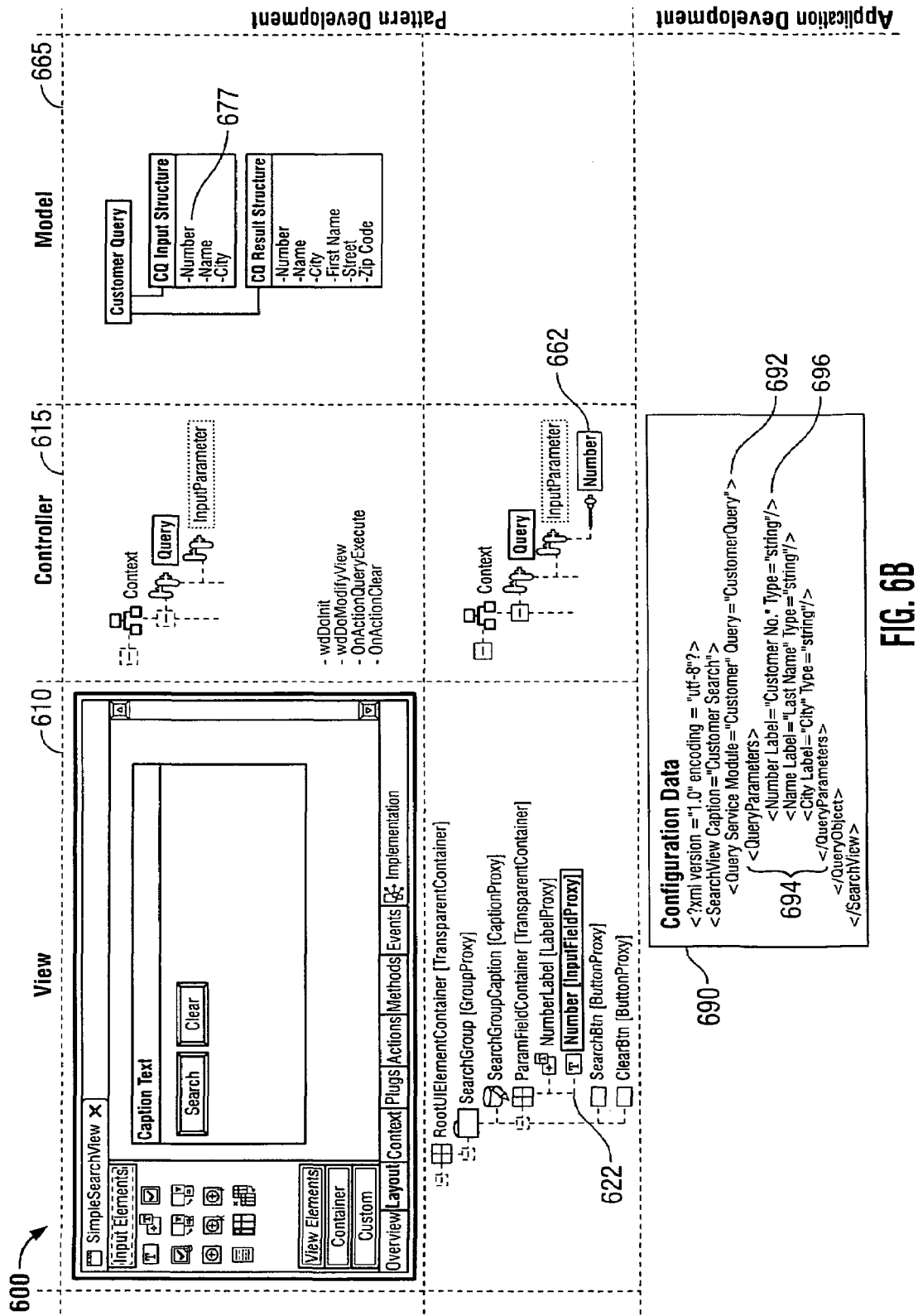

The preceding configuration can be specified as configuration data, an example of which is shown as XML data 690 in FIG. 6B. The XML configuration data 690, which is discussed in more detail below, can be used to generate the execution-related entities in the pattern component 600 that are required to implement the specified configuration for the OIP pattern. For example, in an implementation in which applications (including pattern components) are structured according to the Web Dynpro programming model, several types of entities can be generated based on the configuration data, including UI elements (e.g., controls in views), data structures (e.g., context entities such as nodes and attributes), and bindings (e.g., context bindings, which serve to couple UI elements and context entities, and model bindings, which serve to couple context entities and model entities).

As a specific example, the XML configuration data 690 includes a first section of data 692 that indicates that the pattern component 600 is to execute searches using a query object named "CustomerQuery" in a back-end service module named "Customer." A service module is a grouping of functionality in a back-end system; the functionality can include business functionality that defines business objects or other entities (e.g., customers), and that provides access to such entities (e.g., through query objects such as CustomerQuery). In this example, the CustomerQuery query object is represented by the customer query object 670 in the model 665.

As discussed above, the application developer has chosen a configuration in which end-users are to be able to execute searches using any of the three available input parameters in the customer query object 670. This selection of input parameters is indicated in a second section of configuration data 694, which lists all three parameters (Number, Name, and City) from the input structure 675 in the customer query object 670.

In particular, the Number parameter 677 in the input structure 675 is listed in the section of configuration data 696. The Number parameter 677 represents customer numbers, and its selection as an available search parameter means that application end-users are to be able to search for customers by providing a customer number (as well as possible additional parameters). To enable such searches, a number of execution-related entities are added to the pattern component 600, including a Number UI element 622 and a Number context attribute 662.

The Number UI element 622 is added to the view 610 so that an end-user can type in a customer number in that UI element. Though not shown in the preview of the view 610 in FIG. 6B, the UI element 622 can be displayed and enabled in the view 610, for example, when an end-user selects an "advanced search" option that exposes a form with multiple fields in which the end-user can enter search criteria. Based on the configuration data 696, the UI element 622 is given the label "Customer No." Moreover, because the configuration data 696 indicates that string-type input is to be provided for the Number input parameter, the UI element 622 is set to be a control that is operable to receive such input (e.g., a text box).

The Number attribute 662 in the context associated with the controller 615 can be used by the pattern component 600 to store input data provided by an end-user in the UI element 622. As with the type of the Number UI element 622, the type of the Number attribute 662 can be set based on the data type indicated in the configuration data 696 (in this case, a "string" type). The coupling between the Number UI element 622 and the Number attribute 662 can be enabled by binding the Number UI element 622 and the Number attribute 662. Bindings between other types of entities can also be created—for example, a context attribute (e.g., the Number attribute 662) can be bound to a model entity (e.g., the Number parameter 677 in the input structure 675 of the query object 670). Such a binding, known as a model binding, generally serves to couple an item with a model entity that represents an abstraction of business logic in a back-end system.

Similar entities (e.g., UI elements, data structure elements, and bindings) can be generated for the other two input parameters (Name and City) specified in the section of configuration data 694. In addition, many other types of entities can be generated based on the configuration data specified by an application developer. Such entities can be used by a pattern component for purposes of navigation and for other UI-related issues. For example, various entities can be generated for purposes of implementing advanced UI functionality, such as input help and input validation.

The use of configuration data to generate execution-related entities for a pattern component can be carried out at various times, including, for example, in a pre-execution operation (e.g., after the configuration data has been specified), when the pattern component or application is loaded into a runtime system or otherwise launched, or during execution of the pattern component or application. In one implementation, the entities are generated on an on-demand basis as they are needed. For instance, in the preceding example, the Number UI element 622 can be generated when the view 610 is first displayed, or even when the Number UI element 622 first becomes visible (e.g., when the end-user exposes an "advanced search" form in the view 610).

Example Configuration Data

To configure a UI pattern (e.g., as in the example configuration described above), a developer can associate the pattern with a specific back-end system and the entities (e.g., queries, input structure, input parameters, input fields, result structure, and/or result fields) available within that back-end system. As described above, such an association can be specified as configuration data stored in a configuration repository or in one or more configuration files. The application developer can use a configuration application that assists him in selecting a back-end system, determining which parameters and other entities exist in the back-end system, selecting an appropriate set of those entities for an application, and specifying all such selections as formatted configuration data (e.g., in a formatted configuration file).

In one implementation, the configuration application uses an interface layer that provides a generic interface to back-end systems. An example of such an interface layer is the interface layer in the Enterprise Service Framework (ESF) developed by SAP. The interface layer includes a repository with meta data corresponding to the back-end data.

Using the example in FIG. 6B, the back-end specific model 665 can be stored as meta data in the meta data repository of an interface layer. The application developer can determine from this meta data that the customer query 670 (defined by the back-end system) is one used to find customer objects. The meta data repository further includes the parameters 675 of the input to the query, namely a number, a name, and a city. The configuration application enables the application developer to select any combination of input parameters 675 that is to be presented in drop down element 640 when view 610 is rendered. The application developer can also select which of the fields in result structure 680 are to be displayed when result objects are returned from the back-end system in response to a query.

An example of configuration data that defines the search portion of a specific application (i.e., that specifies a configuration for a search pattern) is shown below:

```
<?xml version="1.0" encoding="UTF-8" ?>
<SearchView Caption="Customer Search">
    <Query Service Module="Customer" Query="CustomerQuery">
        <QueryParameters>
            <Number Label="Customer No." Type="string"/>
            <Name Label="Last Name" Type="string"/>
            <City Label="City" Type="string"/>
        </QueryParameters>
    </Query>
</SearchView>
```

In this example, the configuration data is represented using XML. Taking the data in order, the first line defines the version and encoding of the XML file. The next line defines the caption that is inserted into the generic caption text 635 of pattern view 610. As indicated, the application associated with this configuration displays "Customer Search" in the title bar to orient the user that he or she is searching for customers. The next line specifies that the query to be executed for this application is the "CustomerQuery" query within the "Customer" service module in the back-end system.

The next five lines specify the input parameters selected by the application developer to be included in drop down element 640. As indicated in the data, the application developer has selected all three of the available input parameters 675, namely "Number", "Name", and "City". Further, the application developer has defined more user-friendly labels for each of the parameters. The configuration data also defines the data type for each of the parameters, so view 610 can provide an appropriate control for each selected field. For example, in an advanced search view, a checkbox can be provided for a Boolean type input parameter, rather than the text entry box that is typically used for string type input parameters.

Although an application developer can generate configuration data directly, the use of a configuration application can advantageously enforce the required schema for the configuration data, so as to ensure that the configuration data is successfully merged with a generic pattern component to generate a specific application.

Figure 7:
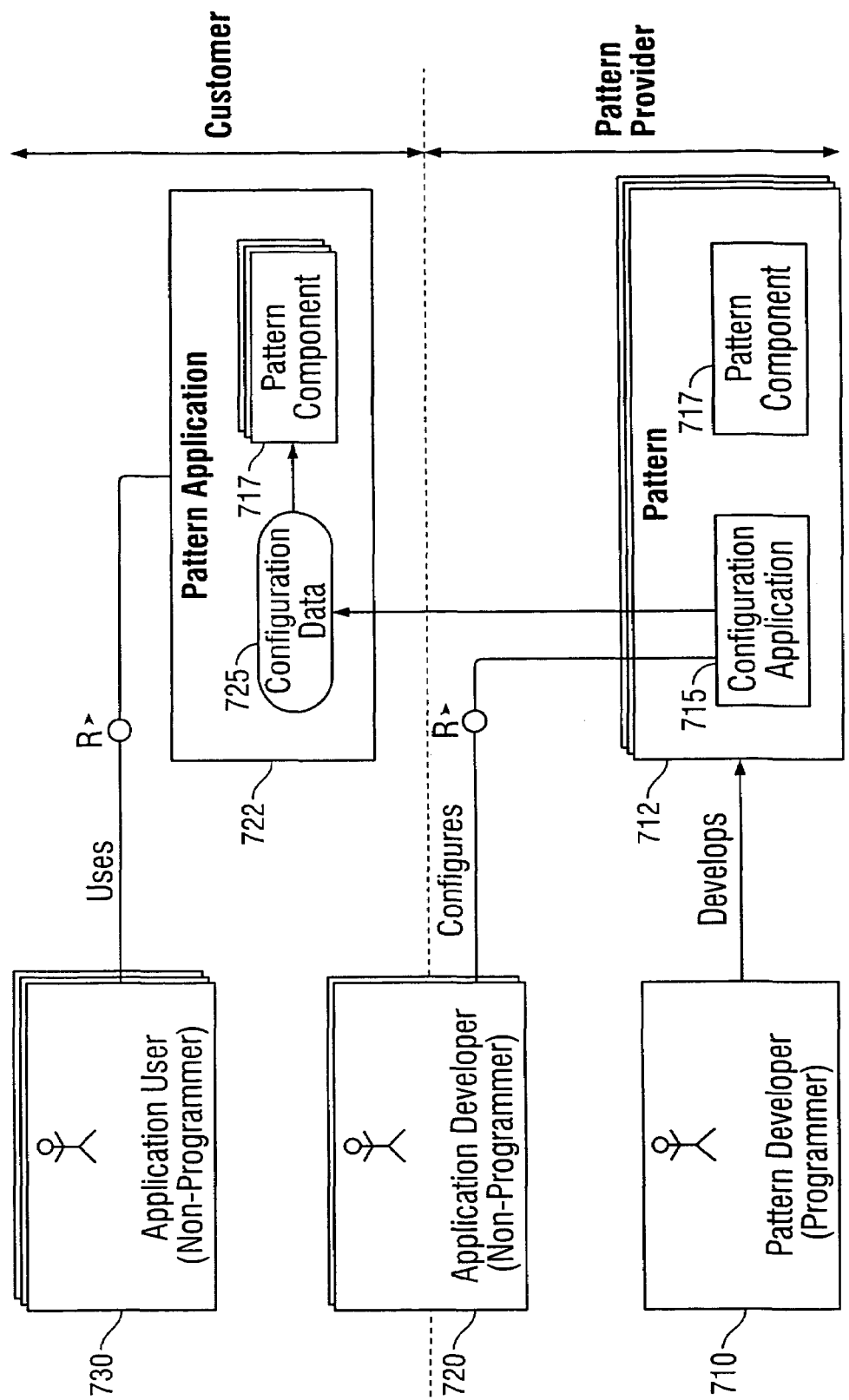
FIG. 7 is a block diagram illustrating different roles and functions involved in the development and use of UI patterns.

FIG. 7 illustrates example roles and functions that can be involved in the process of developing, configuring, and using pattern-based applications. The process begins with the development of pattern 712, which can include the development of a pattern or execution component 717, and a corresponding configuration application 715 that is used to produce configuration data 725 for the pattern component 717. Multiple levels of patterns, and multiple patterns within each level, can be developed. The top level can include different floor plans for different types of business processes. The development of patterns can be carried out by a pattern developer 710 in a pattern-providing organization ("pattern provider"). Pattern developers are typically skilled programmers.

To create a specific application 722 for a specific type of business process, an application developer 720 can configure a floor plan pattern that corresponds to that type of business process (as well as possibly one or more nested patterns). In the implementation shown in FIG. 7, the process of configuring a pattern involves the use of a configuration application 715 to create configuration data 725 for a corresponding pattern component 717. The configuration application 715 can be designed to be very simple to use—e.g., it can be designed to let an application developer configure a pattern by simply choosing among multiple alternatives for each required piece of configuration data. Accordingly, application developers need not have programming skills—rather, they can be non-technical people, such as program managers or business executives who are experts in a particular application or business area.

Multiple application development scenarios are possible. For example, patterns can be delivered by a pattern provider to a customer either with or without corresponding configurations. In the former scenario, an application developer on the pattern provider side configures a pattern and delivers a fully-configured pattern-based application 722 that is ready to be used by an application end-user 730 on the customer side. In the latter scenario, the pattern provider delivers only the patterns (e.g., the configuration applications and the pattern components) to the customer, and an application developer on the customer side creates a pattern application 722 by configuring one or more of the patterns. As another possible scenario, an application developer on the pattern provider side can create and deliver pre-configured applications, which can either be used directly by an end-user, or further adapted by an application developer on the customer side (e.g., by modifying the delivered configurations) in order to meet the specific needs of the customer.

Graphical Configuration Tool

As mentioned previously, a graphical configuration tool can be used to assist a user such as an application developer in configuring an application. For example, a graphical configuration tool can present an application developer with an intuitive interface for configuring a pattern. The interface can include a graphic representation of the pattern being configured. The graphic representation of the pattern can include graphic objects corresponding to the pattern elements in the pattern (e.g., the user interface elements, or other patterns nested in the pattern).

As an example, an OIP can be defined to include multiple pattern elements, such as a search form (e.g., the search bar 125 described in conjunction with FIG. 1), a query in a back-end system that is executed using the search criteria specified by an end-user in the search form, a list pane that displays the results retrieved from the execution of the query using a list or table format, and a form pane that displays the details of a selected entry in the list pane. Each of the above pattern elements can be represented as a graphic object, and the graphic objects can be connected in a way that intuitively represents the relationship between the pattern elements in the OIP. For example, a graphic object that represents the search form can be connected with an arrow to an inbound connector in a graphic object that represents the query. Similarly, an arrow from the outbound connector of the graphic object that represents the query can be connected to a graphic object that represents the list view. Finally, the graphic object that represents the list view can be connected in a similar manner to a graphic object that represents the form view.

In a graphical configuration tool that represents patterns as described above, an application developer can indicate interest in an object (e.g., by clicking on the object), and thereby receive information about the object. For example, if an application developer clicks on a graphic object that corresponds to the search form, the graphical configuration tool can display the parameters that have been selected for searching.

Figure 8:
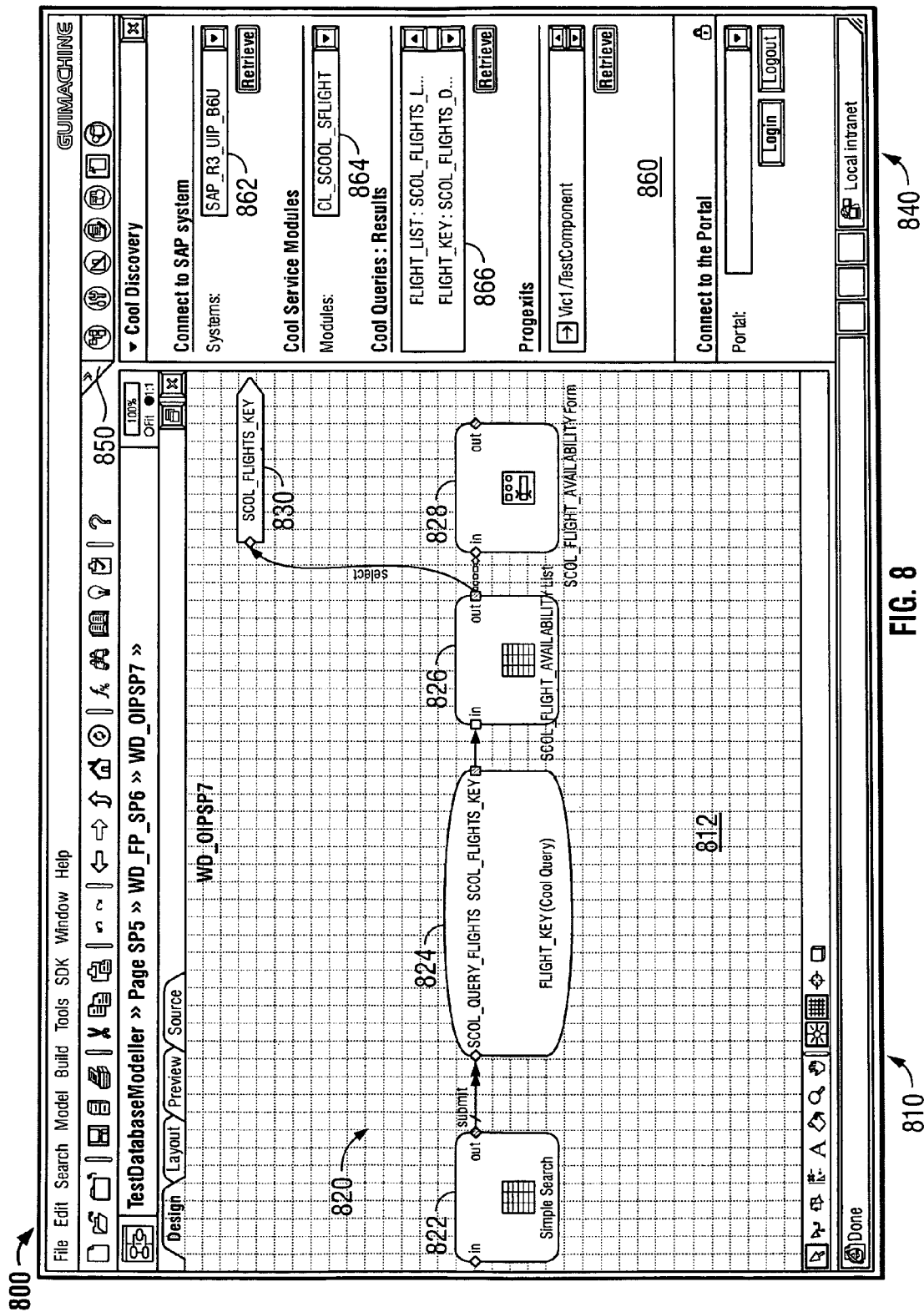
FIGS. 8-10 illustrate examples of patterns that can be configured with a graphical configuration tool.

FIG. 8 illustrates one example of configuring a pattern with a graphical configuration tool. As illustrated, the graphical configuration tool presents a user interface 800 that includes a first portion 810 and a second portion 840. First portion 810 includes a storyboard area 812. As illustrated, storyboard area 812 includes a graphical representation of an object identification pattern (OIP) 820, which includes an data input graphic object 822, a back-end entity graphic object 824, a data output graphic object 826, and a data output graphic object 828. Each graphic object corresponds to a pattern element in the OIP (e.g., a search form, a query, a list pane, and a chart pane).

Data input graphic object 822 represents the input of user data for an application. The data can indicate variables for one or more functions that can be performed on a set of data. In the example, the functions include searching for data for OIP 820. Searching for data can entail using parameters (e.g., fields) for searching and a search range (e.g., a variable). Back-end entity graphic object 824 represents the back-end entity and/or functions for the data manipulation (e.g., search). Data output graphic object 826 and data output graphic object 828 represent the format for displaying the results of the data manipulation. In this example, data output graphic object 826 represents a list of data, and data output graphic object 828 represents a form for data. In operation, an end-user can switch between data output graphic object 826 and data output graphic objects 828 by activating a toggling icon.

Data input graphic object 822, back-end entity graphic object 824, data output graphic object 826, and/or data output graphic object 828 can provide additional information about their functions and/or parameters to a user. To accomplish this, the information can be presented when a user indicates interest in one of the graphic objects (e.g., by clicking on the graphic object). The additional information can include selected parameters and user interface elements for the associated pattern components.

In one mode of operation, data input graphic object 822, back-end entity graphic object 824, data output graphic object 826, and data output graphic object 828 are be presented to a user in a generic form. That is, the specific content for an application (e.g., search parameters and result fields) are unspecified. For the illustrated implementation, when a user specifies something about the application, the search parameters and the result fields associated with that query can be determined. This can, for example, occur when a user specifies data about a back-end entity for the OIP. The back-end entity data can include system, module, and/or query. Once data about the back-end entity is known, it may be possible for the graphical configuration tool to determine an appropriate query, and, hence, search parameters and results.

Determining appropriate search parameters and results can be accomplished by interrogating a meta data repository that specifies the fields available for a particular back-end system for which the application is being developed. The configuration information can be expressed in an XML format, which can be used to generate the execution-related entities in the pattern component that are required to implement the specified configuration for OIP 820.

In particular implementations, an automated selection of configuration information for OIP 820 can be performed for the user. For example, when a user configures OIP 820 by dropping a query onto storyboard area 812, the search parameters and result fields can be preselected by default. The user can then execute OIP 820 without having to make further selections. The user can also specify which, if any, parameters should not be searched. Also, the available types of output data can automatically be placed in data output graphic object 826 and data output graphic object 828 for the user. Again, if he so desires, the user can specify which, if any, output data should not be displayed.

OIP 820 also includes a data port tag 830. Data port tag 830 can represent the data presented in data output graphic object 826 and data output graphic object 828 and data related to the presented data. Related data can, for example, be other data from a table that contains the presented data. Relations can be modeled in the back-end system, and meta data regarding the relations can be retrieved. Associating data port tag 830 with an ODP (e.g., by dragging and dropping the tag) binds the data to the ODP and can allow the data represented by the tag to be displayed in the ODP.

Second portion 840 includes data for OIP 820. Second section 840 includes a task section 850 and a data section 860. Task section 850 allows a user to switch between different tasks for OIP 820. For example, a user can select a logical element task to see which logical elements can be added to OIP 820 (e.g., a chart), or a user can select a properties task to see fields of a selected graphic object. Data section 860 includes data for a task selected in task section 850 and/or OIP 820.

As illustrated, data section 860 includes a drop-down box 862 containing back-end systems, a drop-down box 864 containing back-end modules associated with the back-end system shown in drop-down box 862, and a scroll box 866 containing queries associated with the module shown in drop-down box 864. Drop-down boxes and scroll boxes are one example of selection elements. In particular implementations, these boxes can be automatically generated for the user so that he can select the information therein and have it applied to OIP 820.

Figure 9:
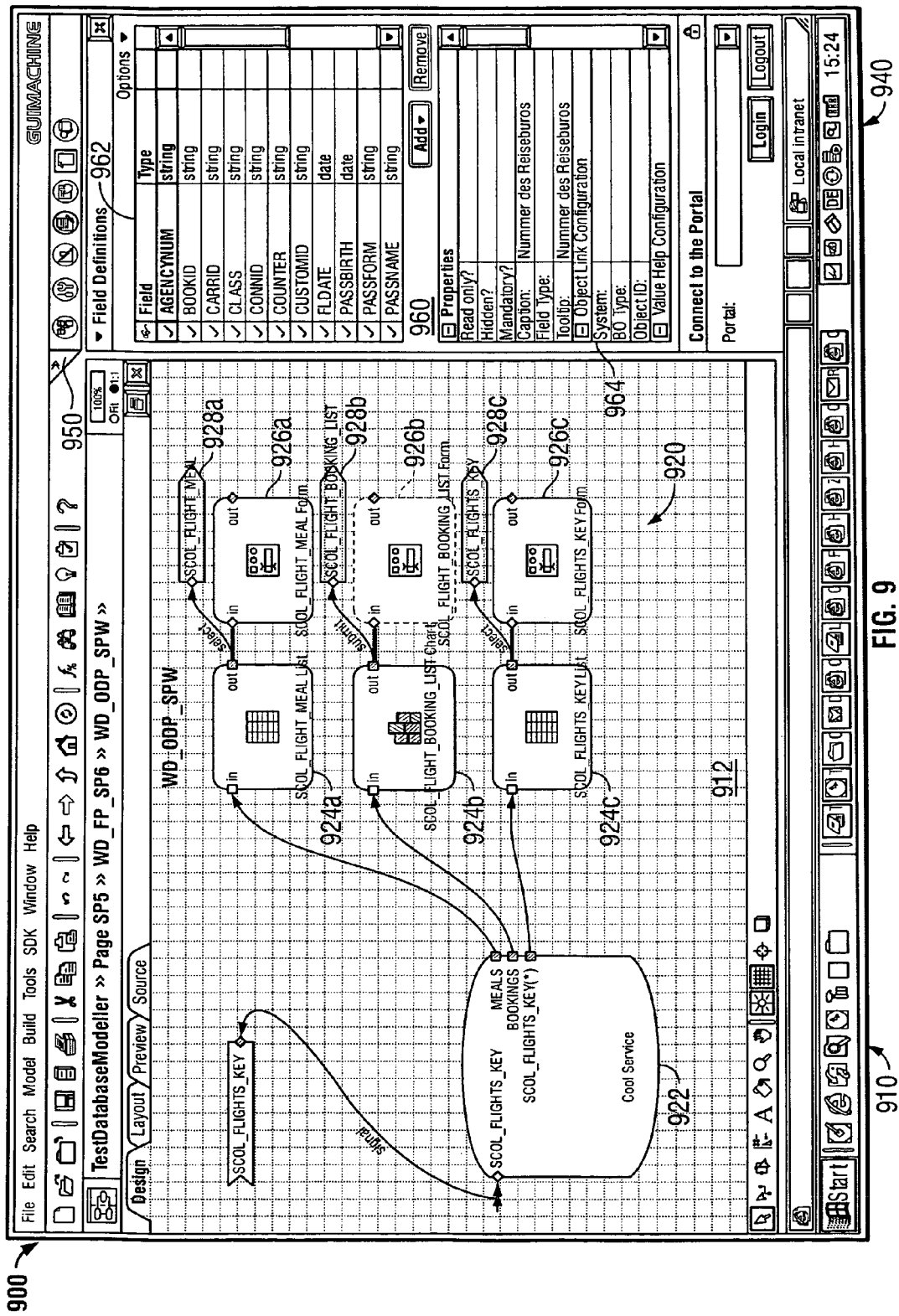

FIG. 9 illustrates another example of configuring a pattern with a graphical configuration tool. As illustrated, the graphical configuration tool presents a user interface 900 that includes a first portion 910 and a second portion 940. First portion 910 includes a storyboard area 912. As illustrated, storyboard area 912 includes a graphical representation of an object data pattern (ODP) 920, which includes a back-end entity graphic object 922, data output graphic objects 924, and data output graphic objects 926. Back-end entity graphic object 922 represents the back-end entity supplying data for ODP 920. Data output graphic objects 924 and data output graphic objects 926 represent the format for displaying the data from the back-end entity. In this example, data output graphic objects 924 represent a list of data, and data output graphic objects 926 represent a form for data. ODP 920 can be part of a floor plan that includes OIP 820.

Back-end entity graphic object 922, data output graphic objects 924, and data output graphic objects 926 can provide further information about their functions and parameters to a user. To accomplish this, the information can be presented when a user selects (e.g., clicks on) one of the graphic objects. Information regarding the graphic objects can then be displayed in user interface 900. The information can include the fields selected for the associated pattern component and the user interface elements.

The illustrated implementation has three data output graphic objects 924. Through these graphic objects, different data can be presented to a user. In particular, each of the graphic objects 924 can correspond to a tab in the actual presentation of ODP 920. Thus, the presentation of the ODP can have a "Flight Meal" tab, a "Flight Booking" tab, and a "Flight Key" tab. The tabs can represent the data from the OIP or related data. By selecting different tabs, the user is presented with different information.

Data output graphic objects 926 can be similarly presented to a user. Also, a user can switch between data output graphic objects 924 and data output graphic objects 926 by activating a toggling icon.

In one mode of operation, back-end entity graphic object 922, data output graphic objects 924, and data output graphic objects 926 would be presented to a user in a generic form (e.g., with the available and result parameters unspecified). Then, when the user specified something about the applications, the output data can be determined. For example, if the user specified the back-end entity that was to supply the data, the available output data can be determined. Additionally, if the user associated an data port tag with the ODP, the available output data can be determined.

In particular implementations, an automated selection of configuration information for ODP 920 can be performed for the user. For example, if a user configures the ODP by dragging a data port tag of an OIP and dropping it on storyboard area 912, or on the floor plan containing the ODP, the ODP can be created with data fields preselected. The number of actions required from the user to make an executable pattern can therefore be reduced. The user can also specify which, if any, related data shown be shown and fields of data that should be shown.

ODP 920 also includes data port tags 928. Data port tags 928 represent additional data associated with the data presented in data output graphic objects 924. Associating one of data port tags 928 with another ODP (e.g., by dragging and dropping it) can allow the data represented by the tag to be displayed in that ODP.

Second portion 940 includes data for ODP 920. Second section 940 includes a task section 950 and a data section 960. Task section 950 allows a user to switch between different tasks for ODP 920. For example, a user can select a logical element task to see which logical elements can be added to ODP 920 (e.g., a chart), or a user can select a properties task to see fields of a selected graphic object. Data section 960 includes data for a task selected in task section 950 and/or ODP 920.

As illustrated, data section 960 includes a scroll box 962 containing data fields for the back-end system and a scroll box 964 containing properties of the data fields in scroll box 962. In particular implementations, these boxes can be automatically generated for the user so that he can select the information therein and have it applied to ODP 920.

Figure 10:
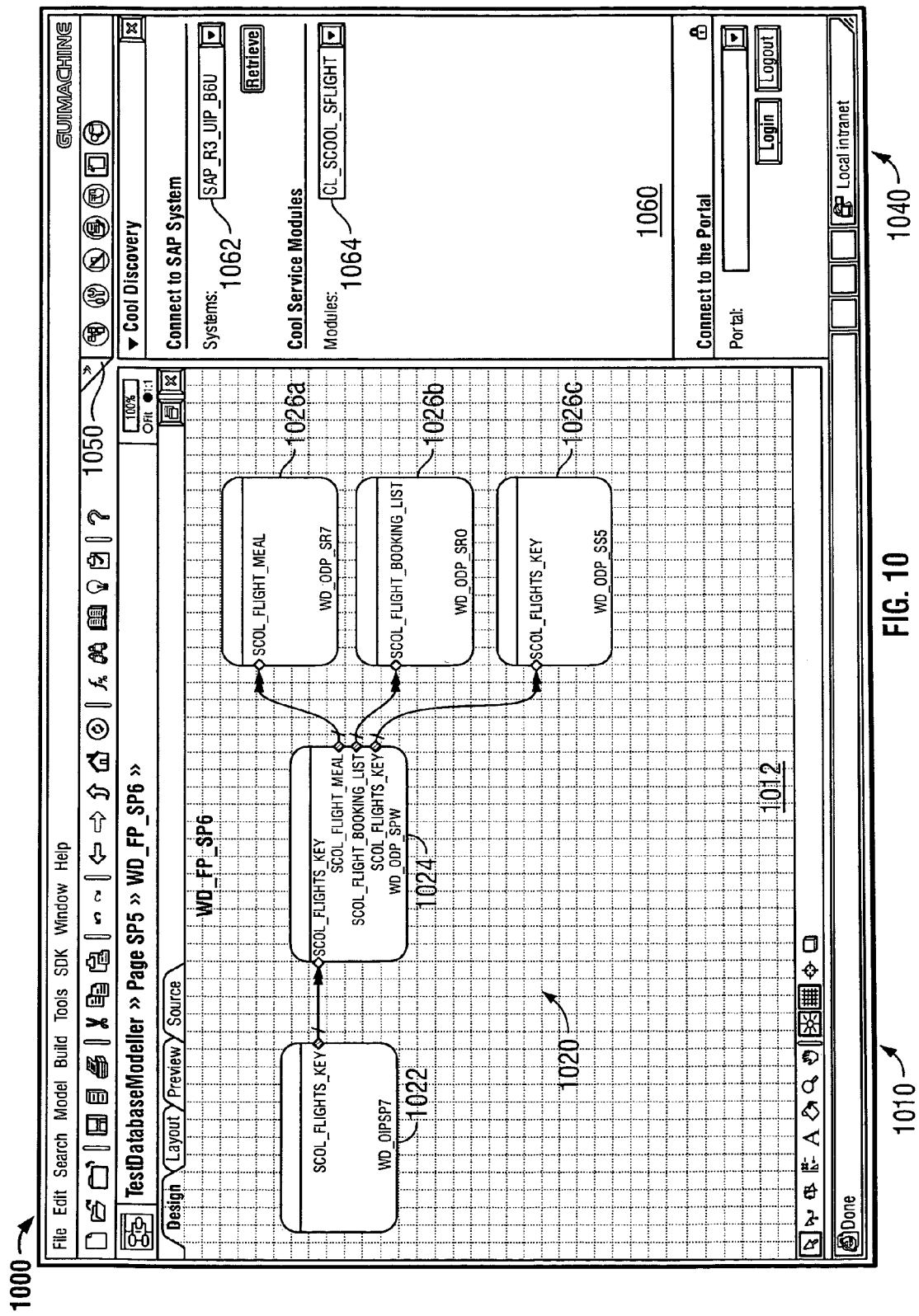

FIG. 10 illustrates another example of configuring a pattern with a graphical configuration tool. As illustrated, the graphical configuration tool presents a user interface 1000 that includes a first portion 1010 and a second portion 1040. First portion 1010 includes a storyboard area 1012. As illustrated storyboard area 1012 includes a graphical representation of a floor plan pattern 1020. Floor plan pattern 1020 includes an OIP 1022 graphic object, an ODP graphic object 1024, and ODP graphic objects 1026. Floor plan pattern 1020 can be the floor plan for OIP 820 and ODP 920.

OIP graphic object 1022 can serve as an anchor point for floor plan pattern 1020. That is, based on the output data specified in OIP graphic object 1022, the data for ODP graphic object 1024 can be determined. ODP graphic object 1024, in turn, can serve as an anchor point for ODP graphic objects 1026. That is, based on the output data specified in ODP graphic object 1022, the data for ODP graphic objects 1026 can be determined.

In one mode of operation, OIP graphic object 1022, ODP graphic object 1024, and ODP graphic objects 1026 can be presented to a user in generic form (e.g., with the input and output parameters unspecified). Then, if a user decides to configure part of the floor plan pattern related to the OIP, he selects OIP graphic object 1022 and is presented with a graphic representation of the OIP (e.g., OIP 820) that presents pattern components related to the OIP (e.g., data input graphic objects, back-end entity graphic objects, and data output graphic objects). The user can then specify configuration information (e.g., search parameters, query service modules, result lists, and result forms) for the OIP. In the same way, if the user decides to configure the portion of the floor plan pattern related to one of the ODP, he selects ODP graphic object 1024 and is presented with a graphic representation of the ODP (e.g., ODP 920) that presents pattern components related to the ODP. The user can then specify configuration information for the ODP. This ability to "zoom in" to specific pattern components of the floor plan pattern allows a user to better appreciate the layout and functions of the different pattern components and can also define for a user a set of possible logical elements and actions that the user can perform on the pattern.

A user can also receive further information about OIP graphic object 1022, ODP graphic object 1024, and ODP objects 1026. To accomplish this, the information can be presented when a user selects (e.g., clicks on) one of the graphic objects.

Graphically presenting the OIP, ODP, floor plan assists a user in intuitively understanding the responsibilities of each part of a configuration. Also, it can restrict a user to those actions that are possible for configuring a pattern. Additionally, by allowing a user to "zoom in/zoom out," the user is presented with a high level pattern diagram (i.e., OIP and connected to it ODP and sub-ODP pattern components).

Second portion 1040 includes data for floor plan pattern 1020. Second section 1040 includes a task section 1050 and a data section 1060. Task section 1050 allows a user to switch between different tasks for floor plan pattern 10120.

For example, a user can select a logical element task to see which logical elements can be added to floor plan pattern 1020 (e.g., a chart), or a user can select a proprieties task to see fields of a selected graphic object. Data section 1060 includes data for a task selected in task section 1050 and/or floor plan pattern 1020.

As illustrated, data section 1060 includes a drop-down box 1062 containing back-end systems and a drop-down box 1064 containing back-end modules associated with the back-end system shown in drop-down box 1062. In particular implementations, these boxes can be automatically generated for the user so that he can select the information therein and have it applied to floor plan pattern 1020.

Using a graphical configuration tool similar to the one under discussion, configuration can be accomplished in a model-based approach (i.e., the user can focus on data-model side of configuration). In operation, a user can first select a system and back-end entity (e.g., service module). The user can then select a query and drop it on the OIP diagram. From this, information about query search parameters and result fields can be retrieved and, accordingly, displayed in search form and result list and result form views. When the user creates an ODP, information about related data can be retrieved and displayed as tabs automatically, so that user can focus on selecting which related data he needs for the floor plan. When the ODP is configured, the user can continue configuration, by, for example, configuring a sub-ODP. A sub-ODP can be configured by dragging and dropping data port tags corresponding to configured related ODPs. In this configuration process, the user can focus primarily on data modeling side of floor plan configuration and receive a better overview of available data modeling cases.

A graphical configuration tool can also allow charts to be readily associated with output data and configured. For example, a user can specify (e.g., drop and drop) a chart object for a result list or a form view and select the chart type, mode, categories and series. After that, when the associated floor plan is executed, a corresponding chart with selected fields is displayed with data from the back-end system.

Figure 11A:
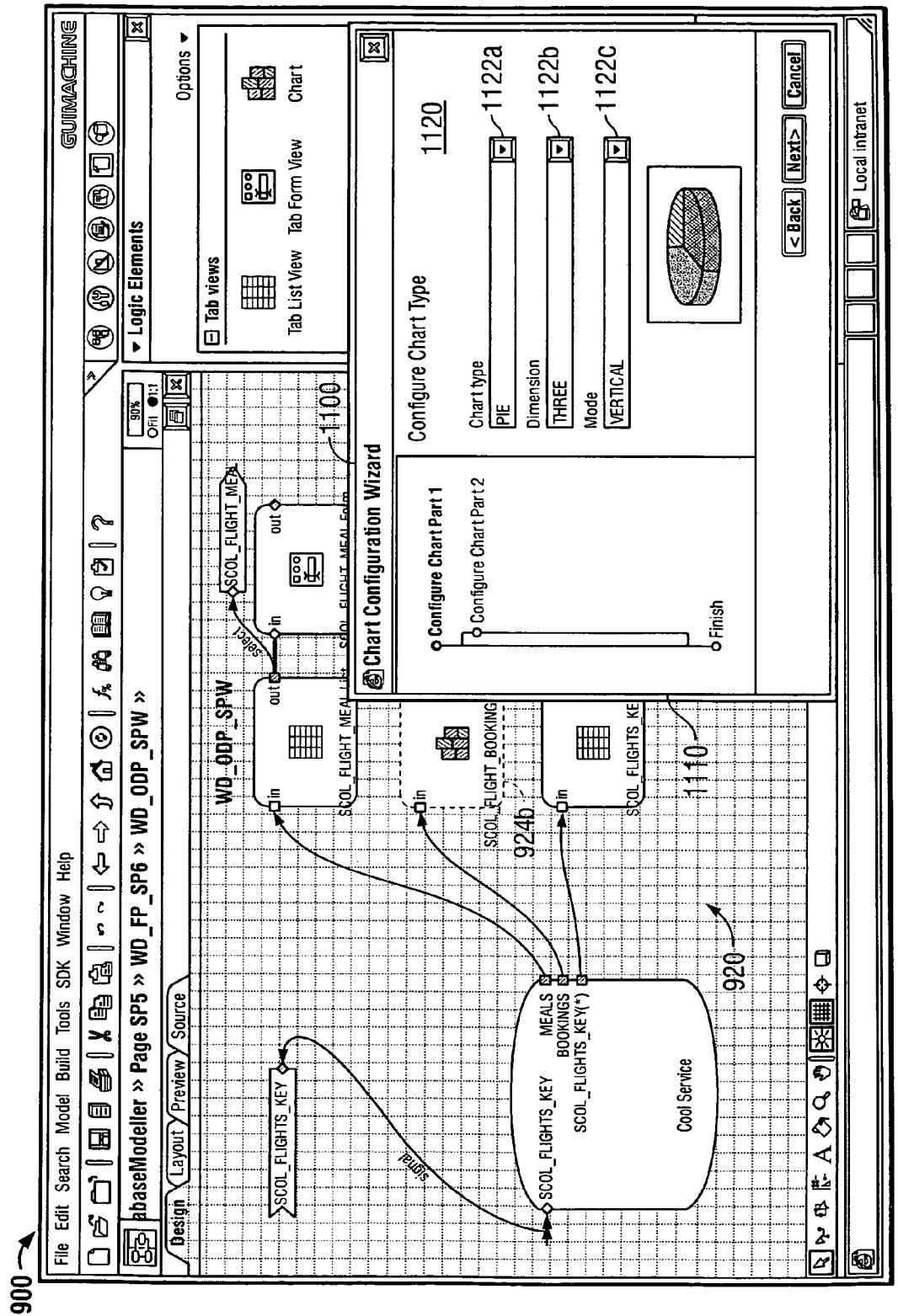
FIGS. 11A-B illustrate an example of configuring a pattern with a graphical configuration tool.
Figure 11B:
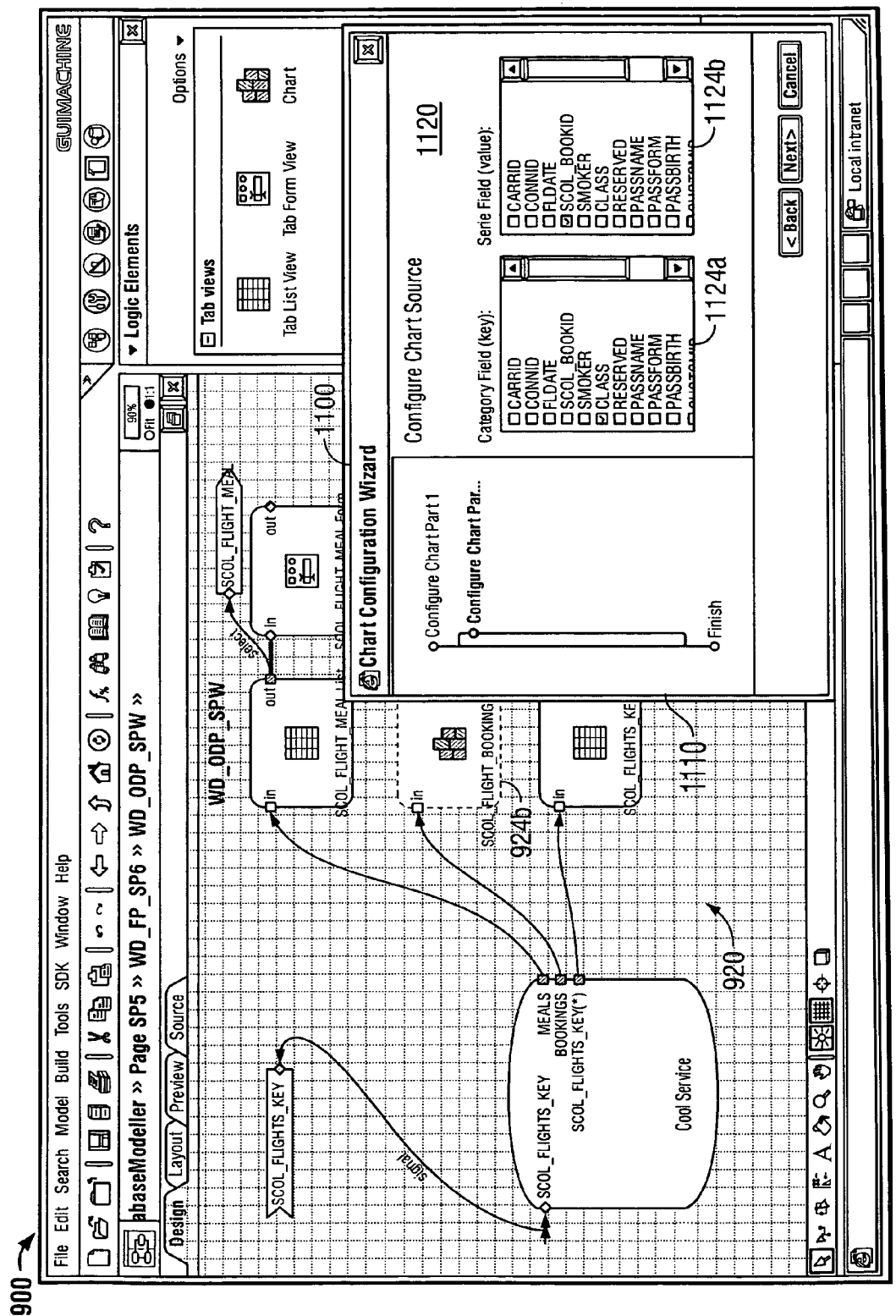

FIG. 11A-B illustrates another example of configuring a pattern with a graphical configuration tool. As illustrated, the graphical configuration tool presents a chart configuration module 1100 that overlays user interface 900. Chart configuration module 1100 can also be presented in a variety of manners.

In the example, a chart is being configured for data output graphic object 924*b* of ODP 920. Thus, the data used to form the chart can include the data available in data output graphic object 924*b*.

As mentioned previously, configuring a chart can be a multi-operation process. In the example, the user is guided through the process with an operation bar 1110. For the stages in the operation, the user is allowed to indicate information in input section 1120.

In FIG. 11A, the user is presented with selection elements 1122 in input section 1120, for indicating information about the chart itself and its display. As illustrated, selection elements 1122 are drop-down boxes. Through selection elements 1122, the user can indicate the type of chart, the dimension of the chart, and the mode of the chart. Fewer or additional selection elements can be presented based on what the user selects in input section 1120.

In FIG. 11B, the user is presented with selection elements 1124 in input section 1120, for indicating the data to be used in the chart. As illustrated, selection elements 1124 are scroll boxes in which the user can select the appropriate data. The data types in the scroll boxes can be generated based on the data in data output graphic object 924*b*. Fewer or additional selection elements can be presented based on what the user selects in input section 1120.

The configuration process can continue similarly to that shown in FIGS. 11A-B until all of the parameters for the chart have been specified. During execution, the chart can be displayed once a user has specified that the back-end data associated with the chart is of interest.

Visually presenting information in a chart format often helps users to understand and draw conclusions from large amounts of data. Providing a way for a user to readily configure charts for the data in the list and data forms makes this data available.

Figure 12:
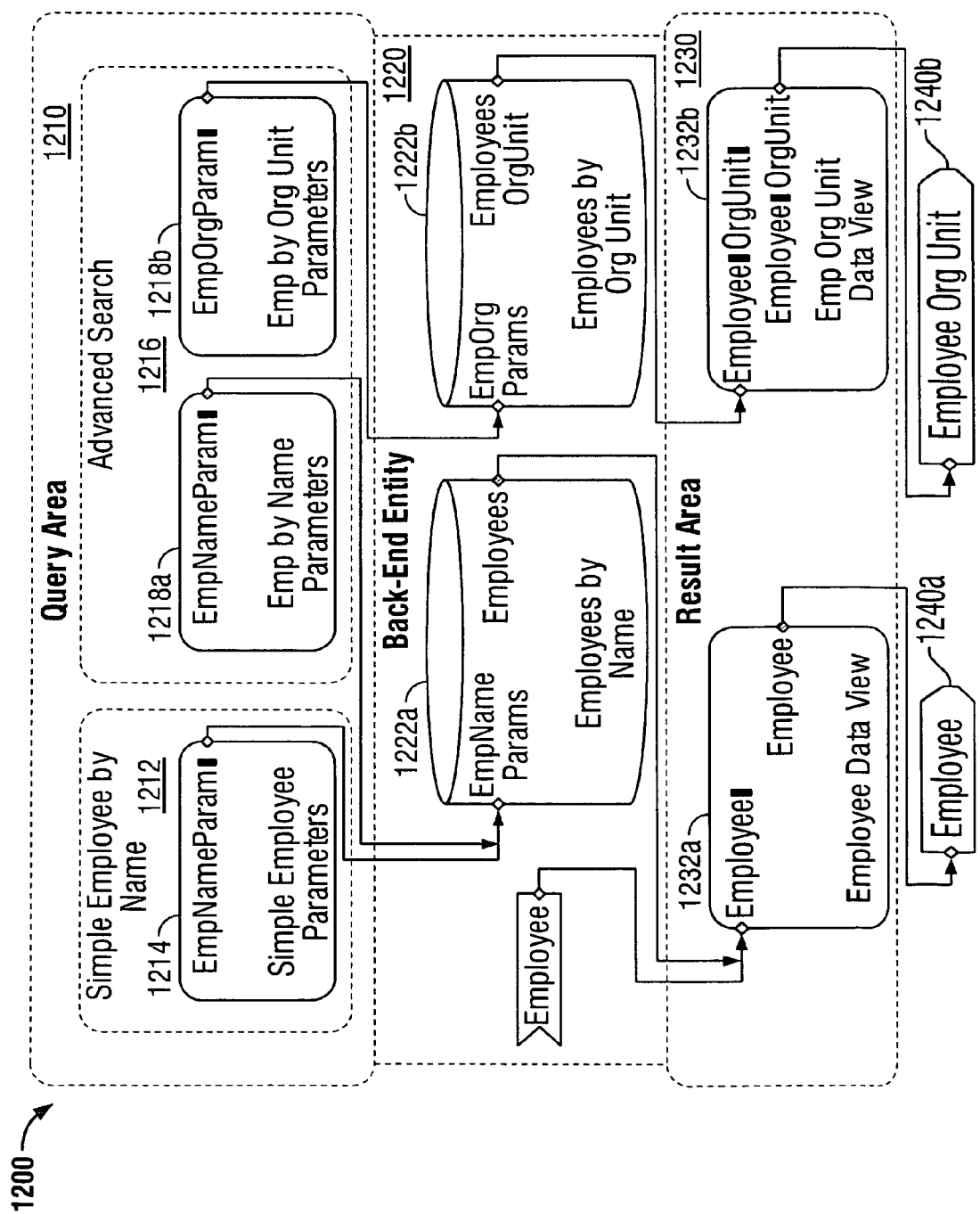
FIG. 12 illustrates another pattern that can be configured with a graphical configuration tool.

FIG. 12 illustrates another example of configuring a pattern with a graphical configuration tool. As illustrated, the graphical configuration tool presents an OIP 1200. FIG. 12 illustrates how OIP 1200 might appear to a business expert using a graphical configuration tool. OIP 1200 has currently been configured for viewing employee data of an organization.

OIP 1200 includes a query area 1210, a back-end entity area 1220, and a result area 1230. Query area 1210 includes a first search area 1212 and a second search area 1216. First search area 1212 and second search area 1216 contain data input graphic objects for OIP 1200, which, in this example, are search parameters graphic objects 1214, 1218, respectively. Back-end entity area 1220 contains representations of back-end entities for the OIP, which, in this example, are query graphic objects 1222. Result area 1230 contains representations of data output graphic objects for the OIP, which, in this example, are data view graphic objects 1232.

Query area 1210 and result area 1230 are visual areas of OIP 1200. That is, these are the areas that an actual end user will see. These areas can be realized via states.

Query area 1210 has three search parameters graphic objects 1214, 1218. Search parameters graphic object 1214 represents a search for an employee by a component of the employee's name (e.g., first, middle, or last name). Search parameters graphic objects 1218 represent a search for an employee by a one or more parameters. Search parameters graphic object 1218*a* allows a search for an employee by one or more components of the employee's name, and search parameters graphic object 1218*b* allows a search for an employee by one or more components of the employee's organizational unit (e.g., division, branch, or section). An application developer can also configure additional queries. In operation, search parameters graphic objects 1218 can be displayed at the same time so that an end user can choose which query to execute.

Search parameters graphic objects 1218 can make use of query services for a meta data interface layer. An example interface layer is the Enterprise Service Architecture (ESA) developed by SAP. The ESA includes a repository with meta data corresponding to back-end data.

Depending on the search selected by an end user, the back-end entity accessed can differ. In this example, two query graphic objects 1222 are used. Query graphic object 1222*a* is linked to search parameters graphic object 1214 and search parameters graphic object 1218*a*. Query graphic object 1222*b* is linked to search parameters graphic object 1218*b*. Thus, search data from search parameters graphic object 1214 and search parameters graphic object 1218*a* is sent to query graphic object 1222*a*, and search data from search parameters graphic object 1218*b* is sent to query graphic object 1222*b*. Also, a different set of query parameter configurations can be used.

Furthermore, depending upon which search an end user selects, a different result view may be needed. In the illustrated example, data view graphic object 1232*a* is associated with query graphic object 1222*a*, and data view graphic object 1232*b* is associated with query graphic object 1222*b*. OIP 1200 illustrates the linkage between data view graphic object 1232*a* and query graphic object 1222*a* and data view graphic object 1232*b* and query graphic object 1222*b*. Thus, the results from query graphic object 1222*a* are conveyed to data view graphic object 1232*a*, and the results from query graphic object 1222*b* are conveyed to data view graphic object 1232*b*.

OIP 1200 also includes data port tags 1240, which represent ports of data view graphic object 1232*a* and data view graphic object 1232*b*. Together, the ports can represent the visible interface of OIP 1200 to an embedder, an OIP-ODP application component. The semantics in terms of Web Dynpro terminology is a component interface event (sending information to the embedder) or a method (receiving information from the embedder) with a certain signature.

Additional elements can also exist. For example, a navigational link is an extension of a data link; it not only transports data, but also executes a navigation. As another example, there can be special kinds of operators (e.g., a sort operator to sort the result set of a service using a certain criteria and a condition operator for choosing between several possible states that one can show). As a further example, an infoset can represent the data that is transported. An infoset can have a designated structure. One type of infoset is a data object in ESA. Infosets may not be visualized in the graphical configuration tool, but may be configured using property sheets. As an additional example, restrictive stereotypes can be defined by the pattern developer in order to restrict the flexibility of the runtime for the purpose of user interface standardization. Restrictive stereotypes represent a collection of constraints on a component. Restrictive stereotypes can be deactivated by a business expert in order to have a higher degree of flexibility.

While this illustration of OIP 1200 presents a semantical picture for the business expert, it can suppress many details to keep the complexity of the operation small. These details can be implicit assumptions for the graphical configuration tool, and can be realized in the implementation of the OIP Web Dynpro component.

Some of the implicit assumptions in the illustration are that second search area 1216 is opened by a button "Open Advanced Search" displayed in first search area 1212 and that when second search area 1216 is selected, first search area 1212 is deactivated, but still visible. Also, it is assumed that a close button exists in second search area 1216, which activates first search area 1212 again. Also, in the implementation there are at least four ports that are outgoing of the OIP components instead of the displayed two. For example, one extra port per result view is required to distinguish between the information that the result view has been opened versus the selected row in the result view being changed. Additionally, when the application is launched via an object link, OIP 1200 displays only one business object in the dataview list. The dataview is minimized to one row. Furthermore, in general, the patterns have minimized, normal, and maximized perspectives. The semantics of this can depend on the pattern definition and is, therefore, not necessarily generic.

Figure 13:
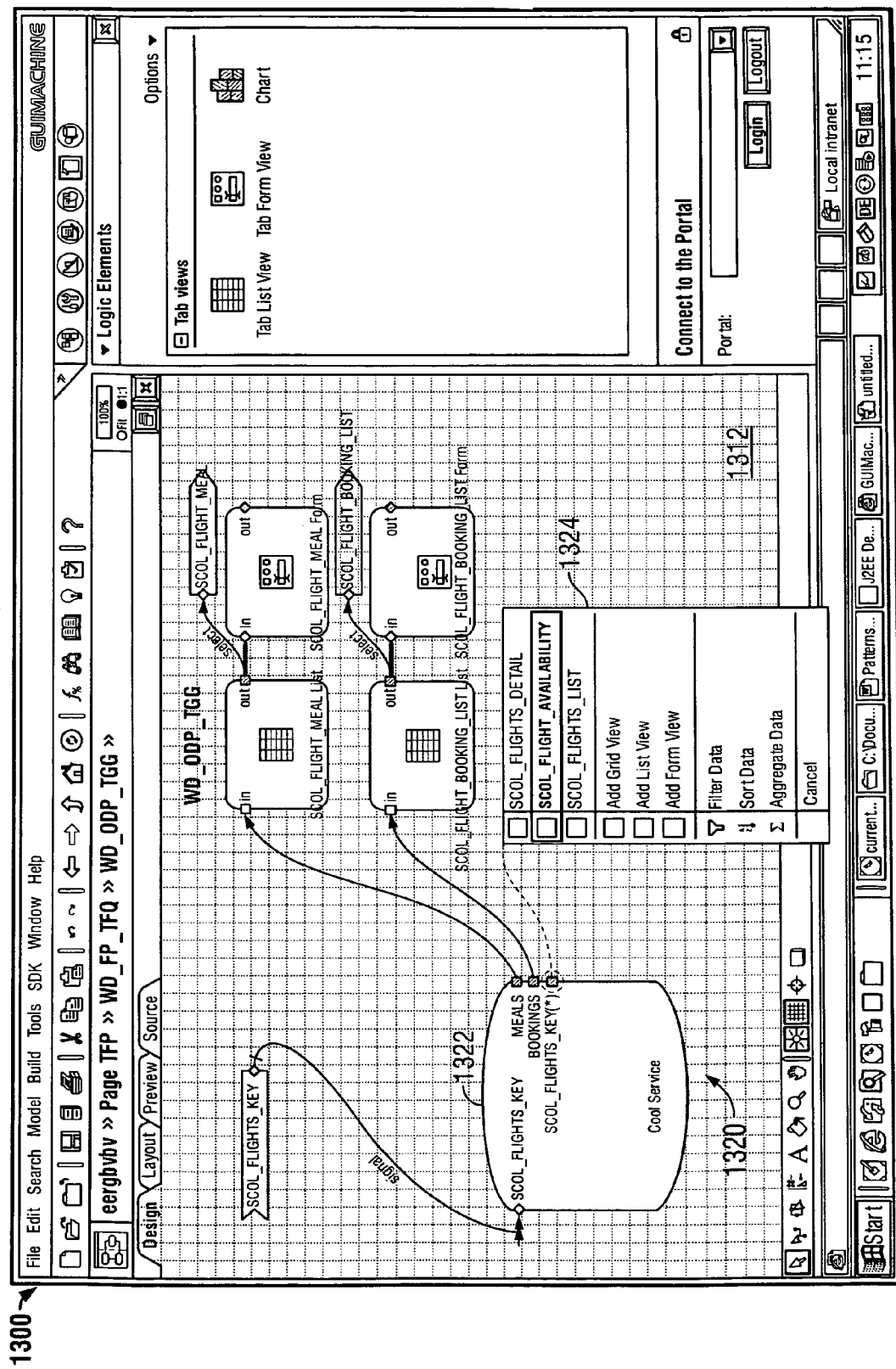
FIG. 13 illustrates another way of configuring a pattern with a graphical configuration tool.

FIG. 13 illustrates another example of configuring a pattern with a graphical configuration tool. As illustrated, the graphical configuration tool presents a user interface 1300 that includes a first portion 1310. First portion 1310 includes a storyboard area 1312, which includes graphic representation of a pattern 1320. Pattern 1320 can, for example, be an ODP.

Pattern 1320 includes a back-end entity graphic object 1322 that has various output ports. One of the ports is associated with a key, which can provide a link to sibling aspects. Sibling aspects can be presented to a user for selection for data output graphic objects.

An aspect is a meta model class that represents an object (e.g., a data structure) in a back-end entity. For example, in an object oriented back-end, an aspect can represent a business object such as employee, customer, order, address, or product. In a database back-end, an aspect can represent a database row. An aspect itself can be table.

Aspects can be related and/or siblings. Related aspects have an explicitly defined relationship. For example, a "customer order" aspect can include multiple "order item" aspects that describe the items included in a particular order. Thus, an explicit relationship would be defined (i.e., that a "customer order" aspect includes an aggregation of "order item" aspects). Aspects are siblings if they have a common key aspect (e.g., search parameter).

In operation, when a user drops a data port tag into a pattern—an ODP, for example—output parameters can be displayed in result list and form view. But the user can also choose not to use this aspect, but a sibling aspect. In the illustration, the sibling aspects entries are presented in a context menu 1324. The context menu can be presented when the user drags from an output port. The sibling aspects can also be presented in any other appropriate manner.

FIGS. 14A-E illustrate an additional procedure that a graphical configuration tool can perform to assist a user in configuring a pattern. By this procedure, the graphical configuration tool can determine a variety of configuration parameters based on a limited number of user selections.

Figure 14A:
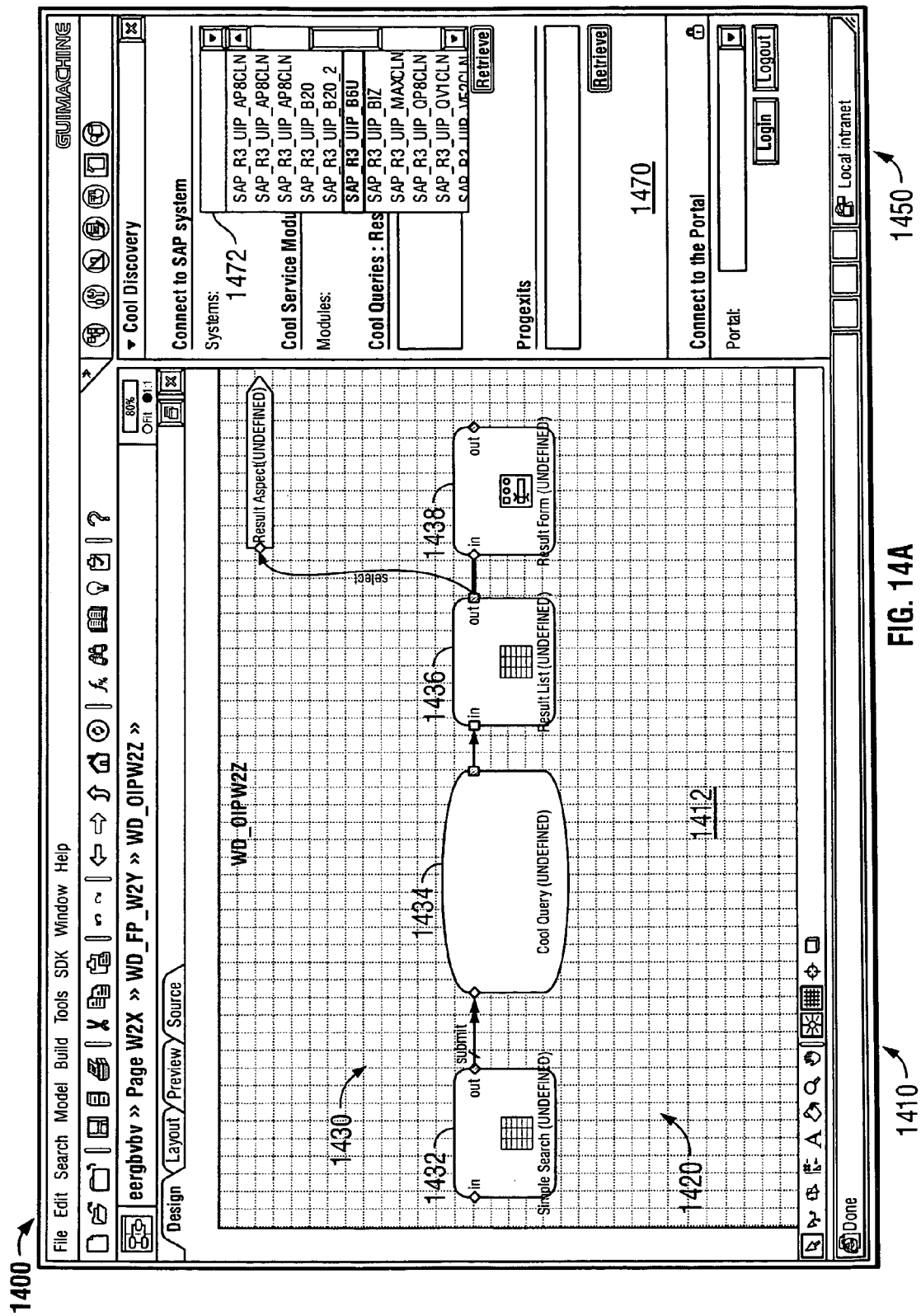
FIGS. 14A-E illustrate an automated pattern configuration that a graphical configuration tool can perform.

FIG. 14A illustrates a user interface 1400 having a first portion 1410 and a second portion 1450. First portion 1400 includes a storyboard area 1412, which includes part of a floor plan pattern 1420. As illustrated, the part of floor plan pattern 1420 is an OIP 1430. OIP 1430 is represented by a data input graphic object 1432, a back-end entity graphic object 1434, a data output graphic object 1436, and a data output graphic object 1438. The graphic objects are presently generic (i.e., the parameters of their associated pattern components have not been defined).

Second portion 1450 includes a data area 1470. Data area 1470 presents and allows a user to specify configuration information for floor plan pattern 1420. In FIG. 14A, data area 1470 includes a drop-down box 1472 by which a user can select a back-end system for OIP 1430. The graphical configuration tool can, for example, determine the available back-end systems by querying a meta model of the back-end systems and place descriptions of them in drop-down box 1472.

Figure 14B:
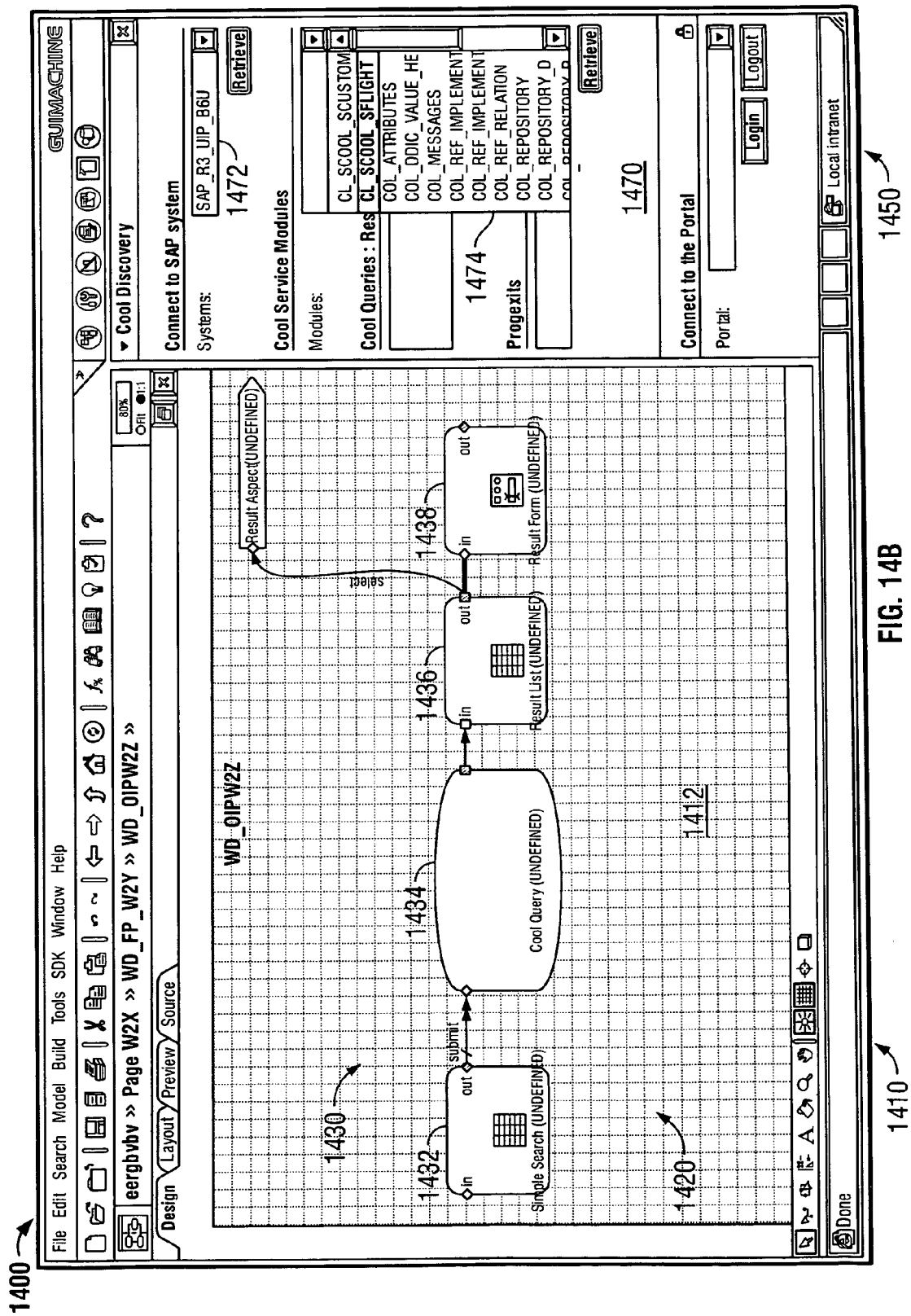

FIG. 14B also illustrates first portion 1410 and second portion 1450 of user interface 1400. Again, first portion 1410 includes storyboard area 1412, which includes OIP 1430 of floor plan pattern 1420. And OIP 1430 is represented by data input graphic object 1432, back-end entity graphic object 1434, data output graphic object 1436, and data output graphic object 1438, which are generic.

Second portion 1450, however, now presents a drop-down box 1474 by which a user can select a module of the back-end system selected in drop-down box 1472. A module can, for example, be a set of queries, business objects, or actions. The graphical configuration tool can, for example, determine the available modules of the selected back-end system by querying a meta model of the back-end system and place descriptions of the modules in drop-down box 1474.

Figure 14C:
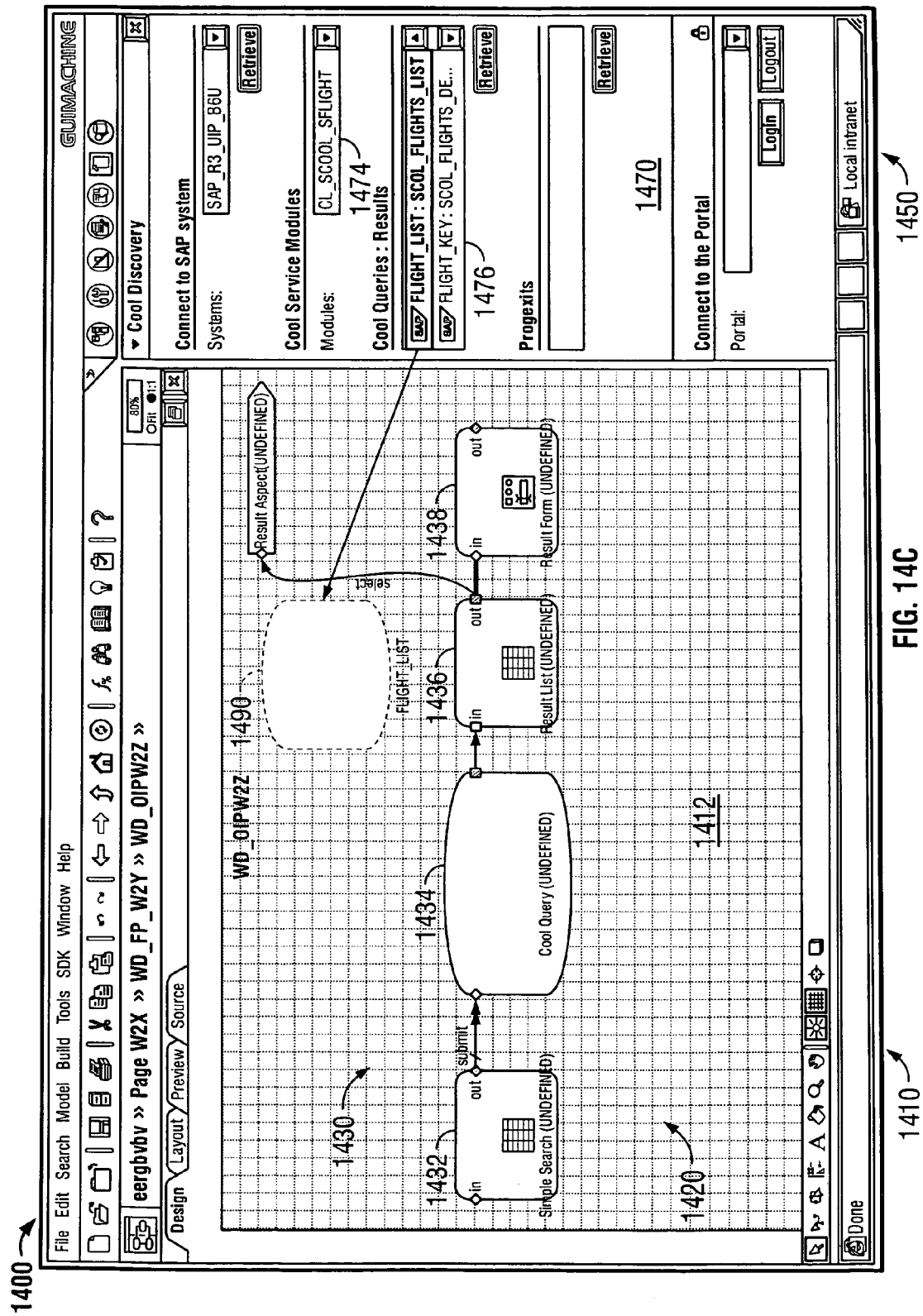

FIG. 14C also illustrates first portion 1410 and second portion 1450 of user interface 1400. Again, first portion 1410 includes storyboard area 1412, which includes OIP 1430 of floor plan pattern 1420. And OIP 1430 is represented by data input graphic object 1432, back-end entity graphic object 1434, data output graphic object 1436, and data output graphic object 1438, which are generic.

Second portion 1450, however, now presents a drop-down box 1476 by which a user can select a query of the module selected in drop-down box 1474. A query can, for example, be a database call. The graphical configuration tool can, for example, determine the available queries of the selected module by querying a meta model of the module and place descriptions of the available queries in drop-down box 1476. Upon selection of a query in drop-down box 1476, a graphic representation 1490 of the selected query is shown in storyboard area 1412.

At this time, the query parameters and fields can be determined for OIP 1430. This can, for example, be accomplished by querying a meta model of the selected module based on the selected query. The retrieved information is processed by the graphical configuration tool and displayed in OIP 1430 as fields in data input graphic object 1432, data output graphic object 1436, and data output graphic object 1438. A user can then select the data he needs for the pattern and perform any customization desired for the selected fields. The back-end entity can also defined by this operation, and subsequent calls to retrieve search parameters and result fields.

Figure 14D:
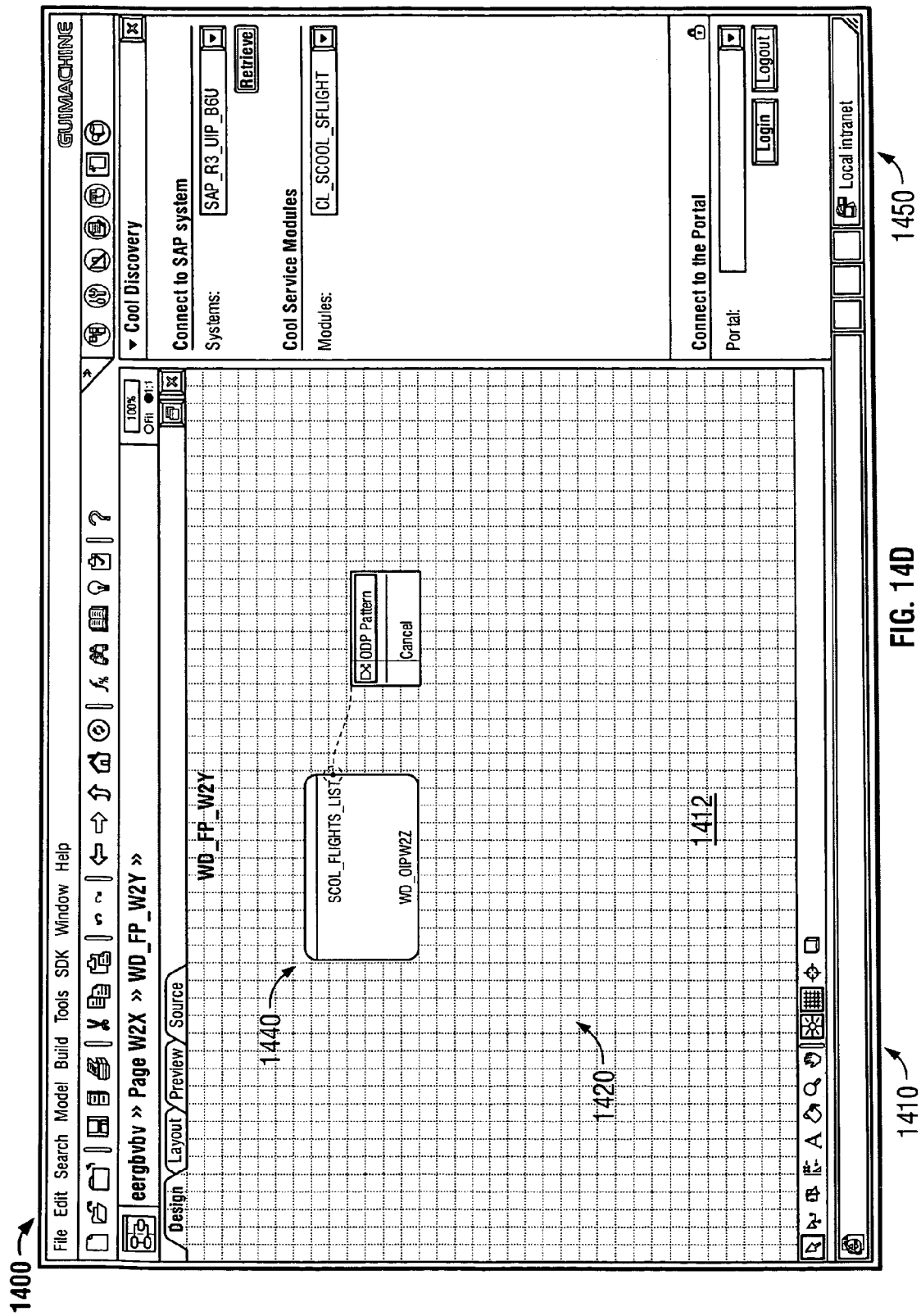

After configuring OIP 1430, the user can generate an ODP for floor plan pattern 1420. FIG. 14D illustrates the generation of an ODP 1440 for floor plan pattern 1420. As illustrated, user interface again includes first portion 1410 and second portion 1450, and first portion 1410 include storyboard area 1412.

Figure 14E:
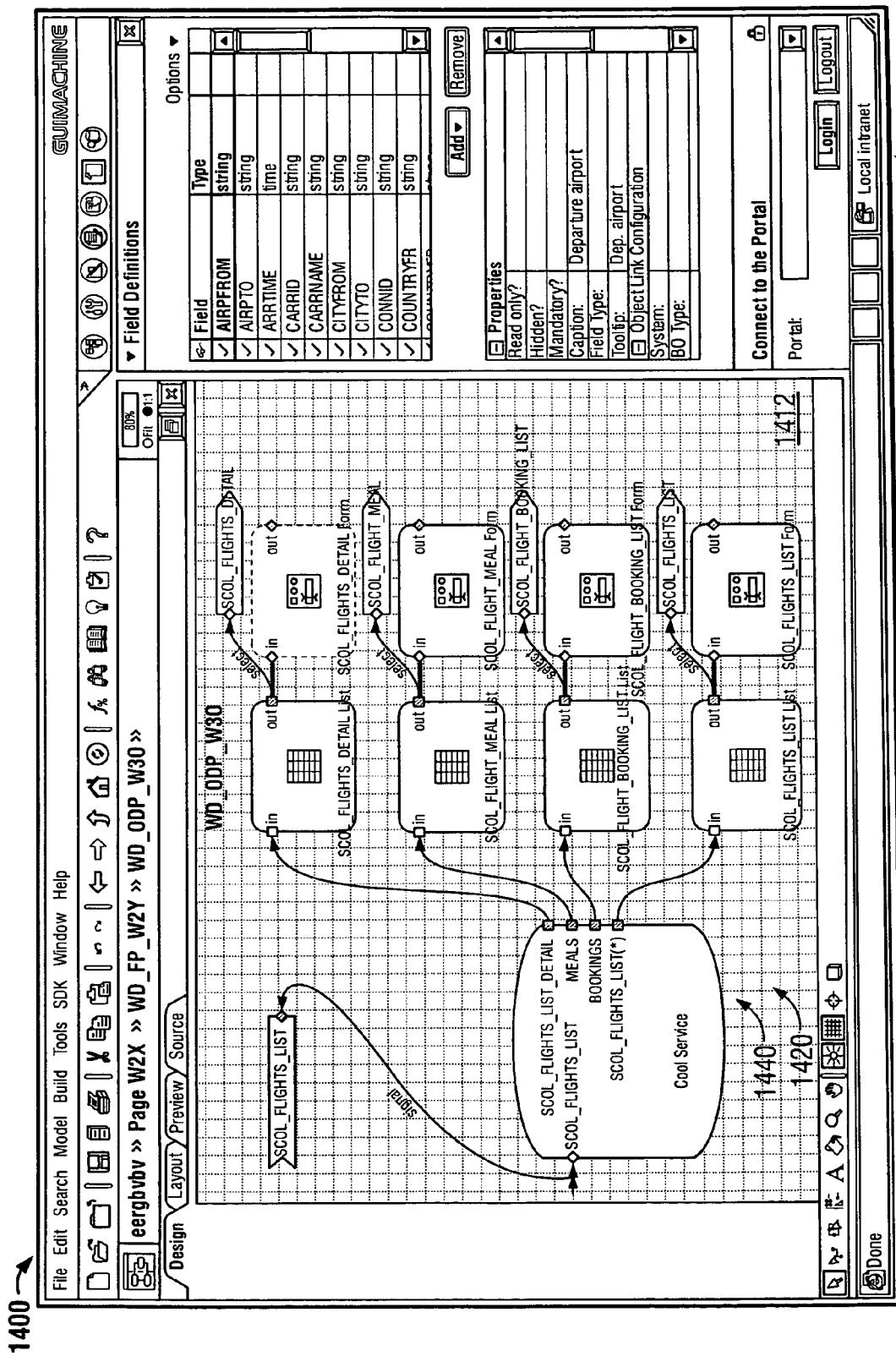

ODP 1440 is generated by dragging and dropping an OIP outgoing data port in first portion and specifying that the outgoing port is to be associated with an ODP. Upon specifying the association, ODP 1440 can be generated, as shown in FIG. 14E. In other implementations, a floor plan pattern may already have an ODP specified (e.g., OIP-ODP-OPD), which needs to be configured by a user.

The graphical configuration tool can then determine the aspects related to the outgoing port. To accomplish this, the tool can query meta data that describes the aspect and any related aspects. Additionally, queries with the same result aspect can be found. This information is processed by the tool and is displayed in first portion 1400, and can be used for the configuration of advanced queries. Second portion 1450 displays information regarding the fields of the aspects for a selected data output graphic object.

The queries to obtain information regarding the back-end systems, modules, queries, fields, and aspects can be performed by Java components that use the meta model to access R/3 meta data. In particular implementations, the Java components can act as an agent for the graphial configuration tool. The description can be represented in XML, and the Java components can run on a J2EE server and be accessible by an XML-based protocol over HTTP. The results can be displayed in a discovery task section of a user interface.

Additionally, the client part of the graphical configuration tool can allow these components to browse the back-end meta data. Thus, the user can be presented with a graphical user interface that hides the complexities and allows easy browsing of the meta data and configuration of patterns. For example, a user can look through a list of available queries in a service module before picking a query to use. Also, by dropping a query, the user can readily check its parameters and ersult fields.

The Java components can be accessed by using a protocol handler (entry point for requests) that creates Java components based on the information in an XML request. The set of components can be independent from each other and, in this way, allow easy extensibility. In case additional browsing components are required, a component can be implemented without any changes to other components. The requests to these components will contain information about it, and the protocol handler will automatically instantiate the component and forward the request to it. The Java compoents can also support caching of heavily instantiated cool objects. Each user session can have its own cache.

Furthermore, the client part can be used independent from graphical configuration tool and, thus, can be accessed from other client. An example access protocol can be based on XML over HTTP.

The Java components can be part of Java Debug Interface (JDI) and, hence, can benefit from all its capabilities, like versioning in a design time repository (DTR), packaging and deployment, and central server builds.

Migrating Applications Over to Patterns

As will be described below, the graphical configuration tool can be used not only to develop and configure pattern-based applications, but also to migrate non-pattern-based applications over to patterns, that is, to convert the non-pattern based applications into patterns-based applications.

Figure 15A:
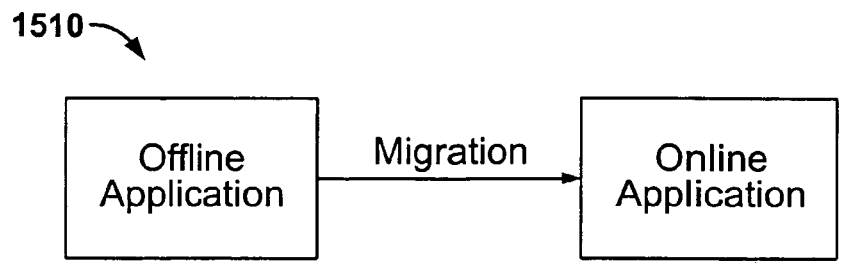
FIGS. 15A-B illustrate application migration scenarios.
Figure 15B:
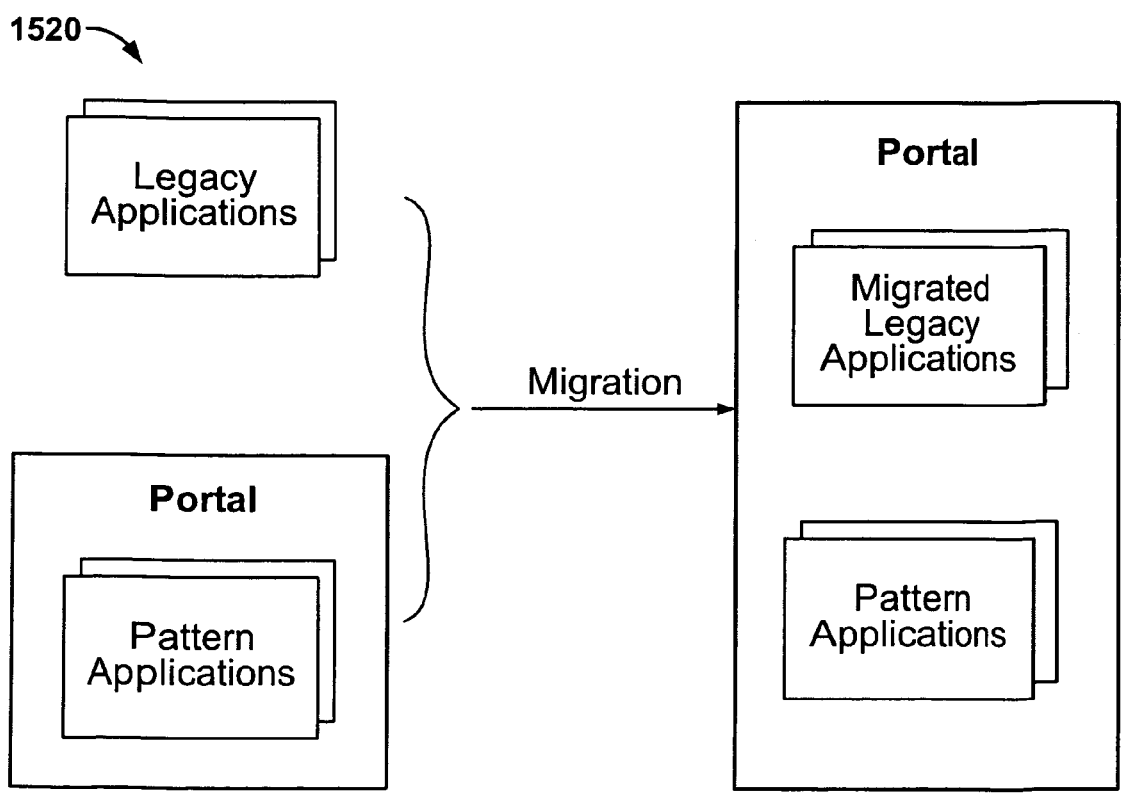

FIGS. 15A and 15B show scenarios where such migration might be desirable. In the first scenario 1510, a company has one or more off-line applications (e.g., Microsoft Access applications, or Lotus Notes applications). These applications require installation on every client that will be using the applications. Using the migration technique described below, these off-line applications can be converted to on-line applications that do not require any client installation.

In the second scenario 1520, a company has one or more pattern applications that are accessible through a portal and one or more legacy applications that are not pattern-based. Using the migration process described below, the legacy applications can be converted to pattern-based applications. Migrating the legacy applications over to patterns enables all the applications to be accessed through the same portal. Also, any run-time services provided by the portal (e.g., support for multiple foreign languages, or support for styles and branding) is automatically made available to all applications. In addition, with all the applications being based on patterns, the applications share a common look and feel, thereby reducing the training and maintenance costs for the applications.

Figure 16:
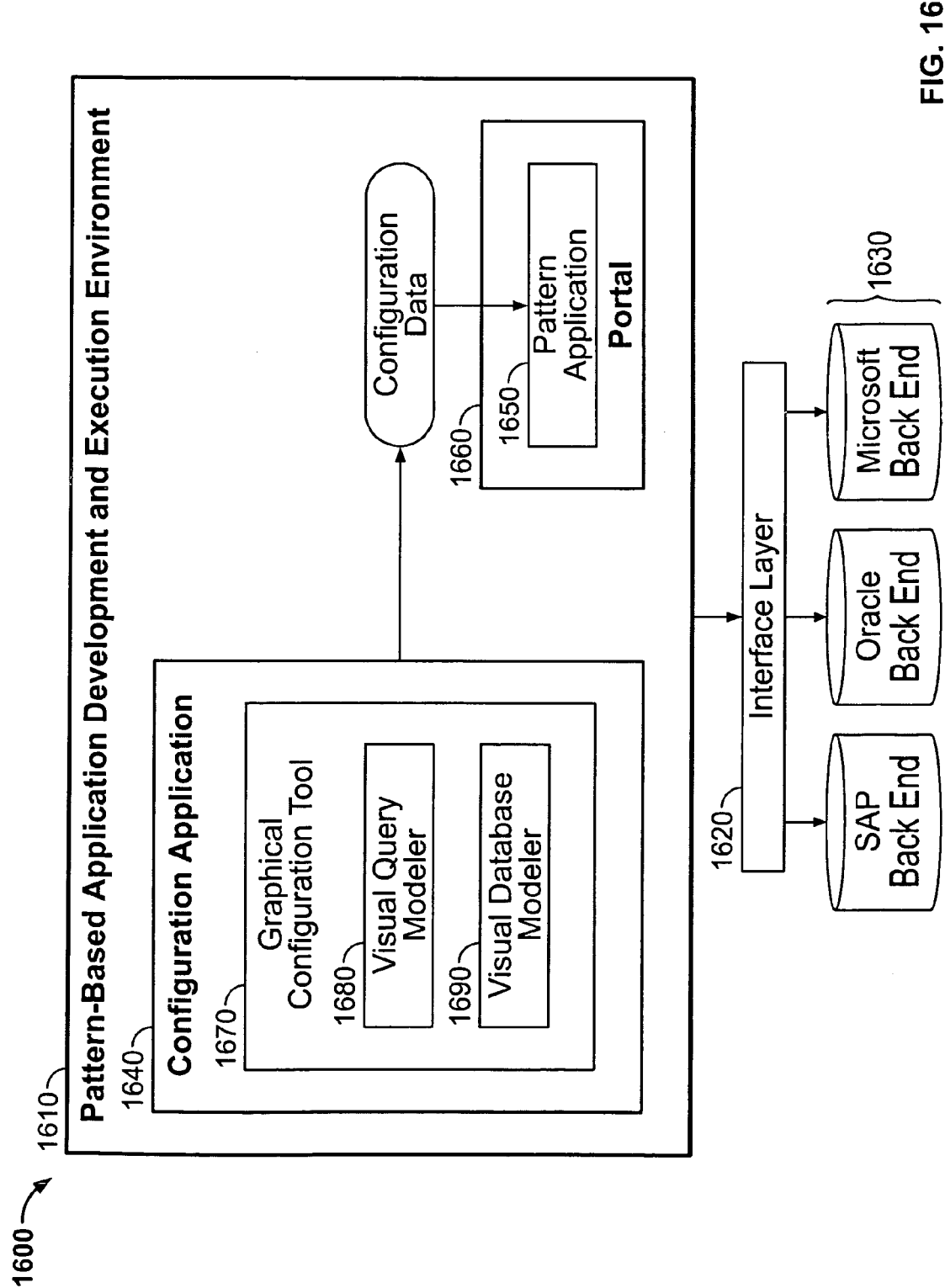
FIG. 16 illustrates a system for migrating applications over to patterns.

FIG. 16 illustrates one implementation of a system 1600 for migrating applications using configurable patterns. By using configurable patterns to perform the migration, the entire migration can be performed without manually rewriting the code of the application being migrated. For example, the system 1600 can migrate the user interface for the application without performing a literal, pixel-to-pixel migration of the user interface. Instead, the entire user interface as a whole can be replaced by a new pattern-based user interface. The pattern-based user interface may look somewhat different from the original user interface, but the application functionality will be the same.

As shown in FIG. 16, the system 1600 includes a pattern-based environment 1610 for developing and executing pattern-based applications. The pattern-based environment 1610 includes a configuration application 1640 and pattern application 1650. The pattern application 1650 is accessible through a portal 1660 hosted by a web application server. One such web application server is the SAP NetWeaver, available from SAP AG of Walldorf (Baden), Germany.

The configuration application 1640 provides a graphical configuration tool 1670. Integrated with the graphical configuration tool 1670 are a visual query modeler 1680 and a visual database modeler 1690. The visual query modeler and the visual database modeler will be described in more detail below.

The system 1600 also includes an interface layer 1620. As described above, the interface layer provides a generic interface to the back end systems 1630 used by the pattern-based applications. The generic interface allows the pattern-based environment 1610 to access the data in the back end systems without regard to which type of database exists in the back end systems 1630. With such an interface, the pattern-based environment 1610 can continue to work with the application even if the back-end of the application is subsequently migrated to a different back-end.

Figure 17:
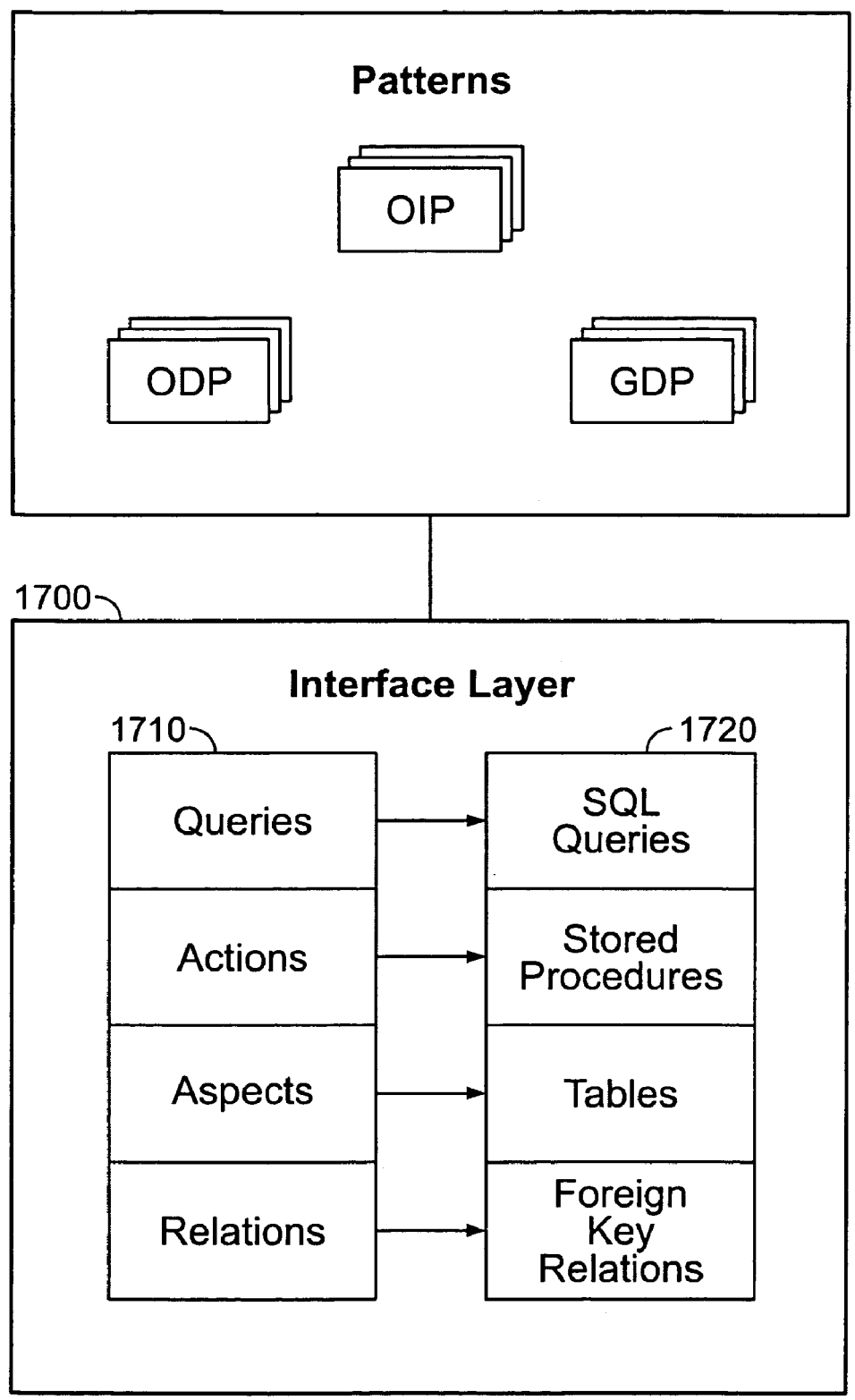
FIG. 17 illustrates an interface layer.

FIG. 17 shows an example of an interface layer 1700 that can be used with both SAP R/3 databases and with relational databases developed by other database vendors. The interface layer 1700 provides access to a set of R/3 data entities 1710 as well as a corresponding set of relational data entities 1720. The R/3 entities include queries, actions, aspects and relations. These entities can be mapped respectively to SQL queries, stored procedures, tables, and foreign key relations in a relational database.

With such an interface layer, the same patterns can be used with different back ends. It is not necessary to use a different set of patterns when a different back end is used. An example of an interface layer that can be used with multiple databases and other back-end systems is described in U.S. application Ser. No. 10/842,958, filed May 11, 2004, entitled BROWSING META DATA FOR AN ENTERPRISE SERVICE FRAMEWORK.

Figure 18A:
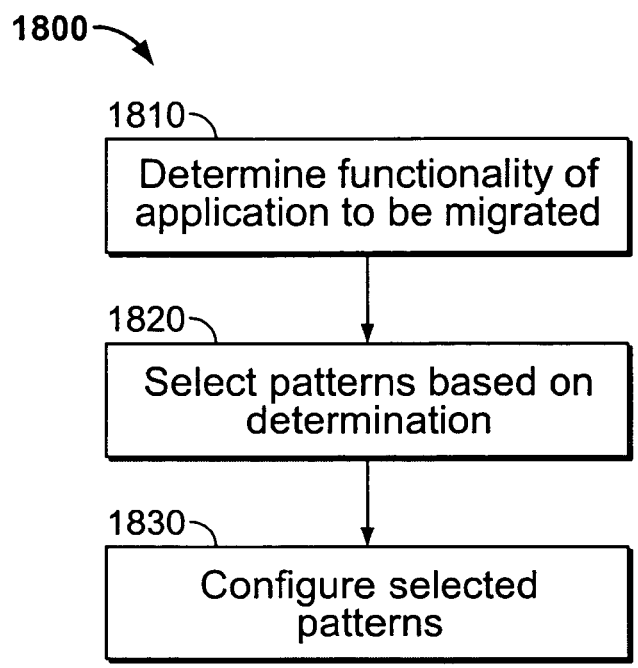
FIGS. 18A-B illustrate a method for migrating applications over to patterns.

During system operation, as shown in FIG. 18A, a developer determines the functionality of the application to be migrated (step 1810). This determination can be made, for example, by manually examining the application.

The developer then selects one or more appropriate patterns based on this determination (step 1820). The patterns are selected from a library of patterns provided by the pattern-based development and execution environment.

The developer then configures the selected patterns to provide functionality that matches the functionality of the application (step 1830).

For example, suppose the application provides a search function that can be used to search for objects. In this example, the developer can select an OIP pattern. The OIP pattern displays a search input form and executes a query based on search input values entered into the search input form by an end-user. The OIP pattern displays the results of the query in a search results list.

In this example, the developer can configure the search input form so that it displays the same search parameters as the original search function and executes the same query as the original search function.

Figure 18B:
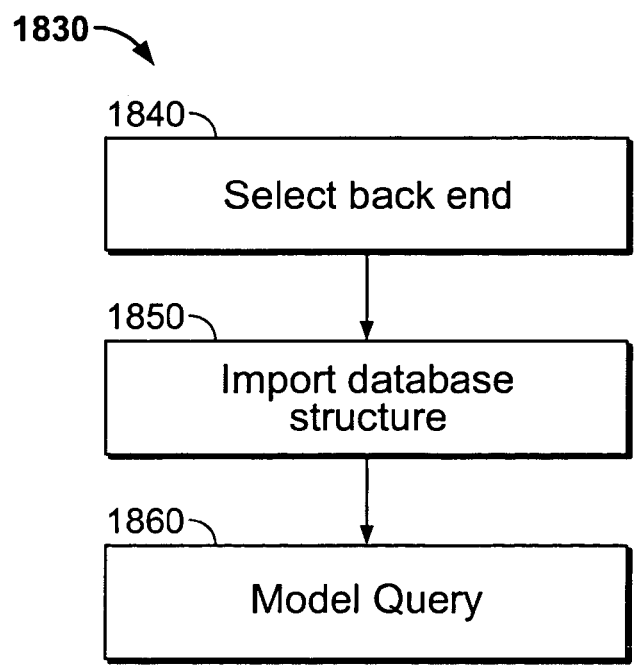

More specifically, as shown in FIG. 18B, the configuration (step 1830) involves first specifying a back end system to be used with the selected patterns (step 1840). In the migration case, the back end that is specified is the back end of the application being migrated.

The developer then imports the database structure of the selected back end (step 1850). Optionally, the developer can model a new database structure or modify an existing database structure, as will be described below with respect to the visual database modeler.

Once the database structure has been imported, the developer models a query to be performed on the database (step 1860). To model the query, the developer can import a pre-defined query from the back end. Alternatively, the developer can define a custom query, for example, using a visual query modeler, as will be described in more detail below.

Figure 19:
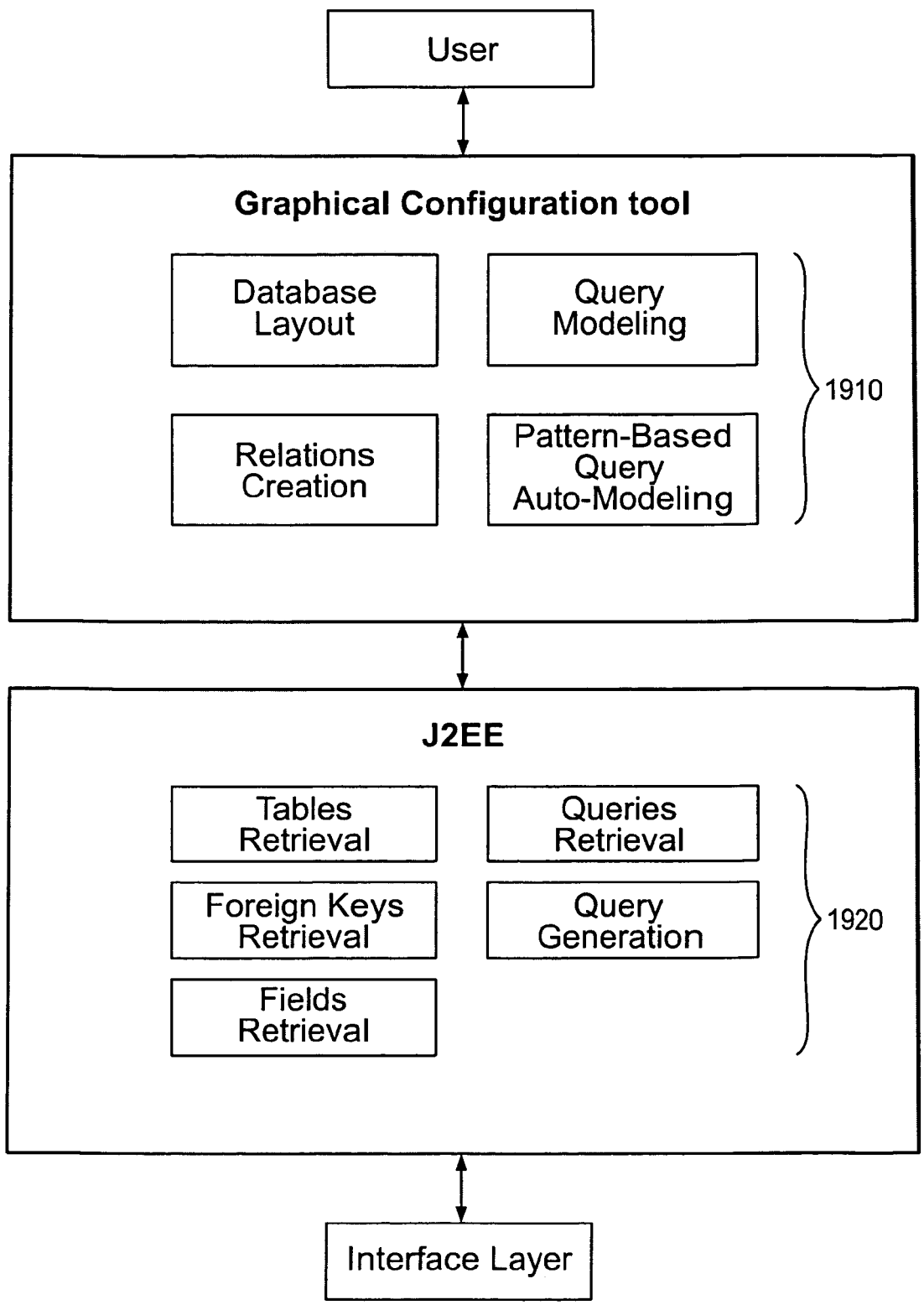
FIG. 19 illustrates design-time services provided by the migration system.

In one implementation, the query modeling and the database importing and modeling can be performed using a number of design-time services provided by the graphical configuration tool. As shown, in FIG. 19, these services 1910 can include a database layout service, a relations creation service, a pattern-based auto-modeling service, and a visual query modeling service. These services can be supported by a number of lower-level services 1920, including a tables retrieval service, a foreign key retrieval service, a fields retrieval service, a queries retrieval service, and a query generation service. The lower-level services 1920 can communicate with the back end systems through the interface layer, as described previously.

In one implementation, the design-time services can be provided by a visual database modeler and a visual query modeler integrated with the graphical configuration tool.

Visual Database Modeler

The visual database modeler allows a developer to generate a graphical representation, or visual model, of the structure of a database. FIG. 20 shows an example of a visual model 2000. Each box 2010 represents a table and each link 2020 represents a relation between tables.

By visually manipulating the visual model, the developer can perform standard database modeling actions, including but not limited to: adding, deleting or modifying tables, table fields, or relations. For example, the developer can drag the tables around to rearrange their layout. The developer can also click on a table to view and modify its fields. The developer can create a relation visually by dragging a link between two tables and then selecting the primary key and foreign key fields from drop-down menus.

The visual database modeler can be used not only to modify the structure of an existing database, but also to model a new database from scratch. In one implementation, the database modeler provides an auto-generate feature that minimizes the amount of user input required to build a database. For example, in response to user input requesting creation of a new database table, the visual database modeler can automatically create a new database table and automatically generate the table names and field names without any further user input. This feature can be useful, for example, for building quick prototypes.

After the visual modeling is complete, the developer can save the visual model without updating the database. The visual model can be saved in XML (extensible markup language) format. Alternatively, the database can be updated to reflect the new model. The new model can also be imported into a different database.

Visual Query Modeler

The visual query modeler allows a developer to model a query visually without using a query language. FIG. 21A shows an example of a visual model 2100 for a query and FIG. 21B shows the equivalent SQL (Structured Query Language) code 2110 for this query. The developer can modify the visual model by clicking and dragging elements of the visual model 2100. The developer can specify inputs and outputs for the query by creating an input port 2120 and an output port 2130 and then connecting each of these ports to one or more tables. In the example shown in FIG. 21, the query only has one input table and one output table. However, for more complex queries, more than one input or output table can be specified.

Figure 22:
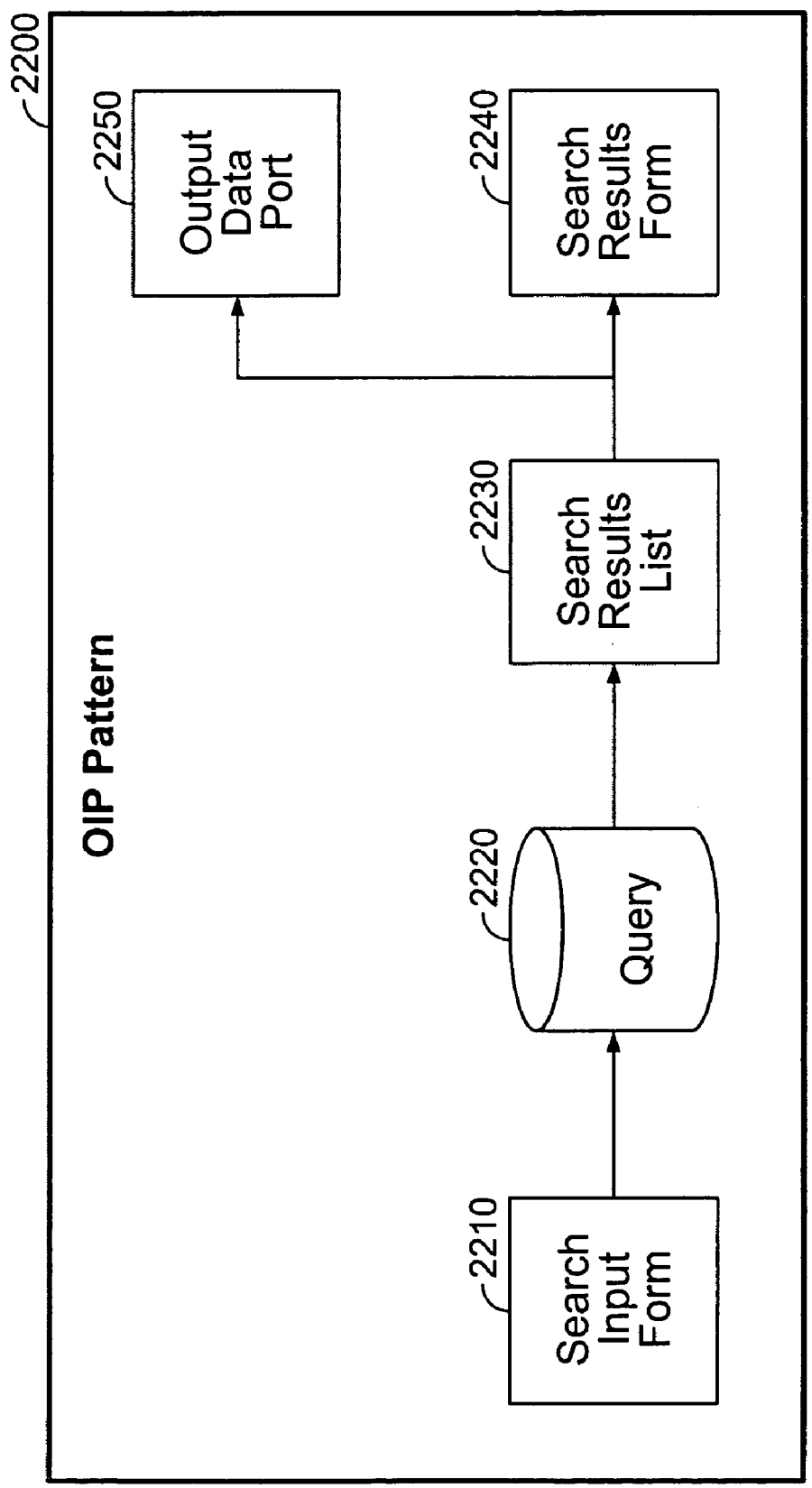
FIG. 22 illustrates a query being used with a pattern.

A query modeled using the visual query modeler can be used to configure a pattern. For example, FIG. 22 illustrates an OIP pattern 2200 as graphically represented by a graphical configuration tool. The OIP pattern 2200 includes a search input form 2210 and a search results list 2230.

The OIP pattern 2200 can be configured by connecting the search input form 2210 and search results list 2230 to a query 2220 modeled using the visual query modeler. The developer can then select which input fields of the modeled query 2220 will be displayed in the search input form 2210 and which output fields of the modeled query will be displayed in the search results list 2230.

Optionally, the developer can define one or more data operations to be performed on the query output. The operations include, but are not limited to, formatting operations, for example, operations that sort or group the output data according to certain fields, and data manipulation operations, for example, an operation that calculates the sum or product of multiple output data values.

In one implementation, the visual query modeler can automatically generate queries based on selected patterns. For example, the visual query modeler can automatically generate queries for an ODP pattern based on the output of an OIP pattern. As previously described, the ODP pattern is a pattern that displays related data for an item selected from the OIP search results. The visual query modeler can automatically retrieve this related data by automatically generating queries based on existing relations in the back end system.

The visual query modeler can also adapt the query output. Adaptation allows for fields from related tables to be added to the query output table. For example, suppose the query output table contains CustomerID. The query can be adapted to display customerName instead of, or in addition to, the CustomerID. The adaptation process involves creating a new view that includes fields from the query output table as well as the related tables. The adapted query is then generated based on the new view.

Figure 23:
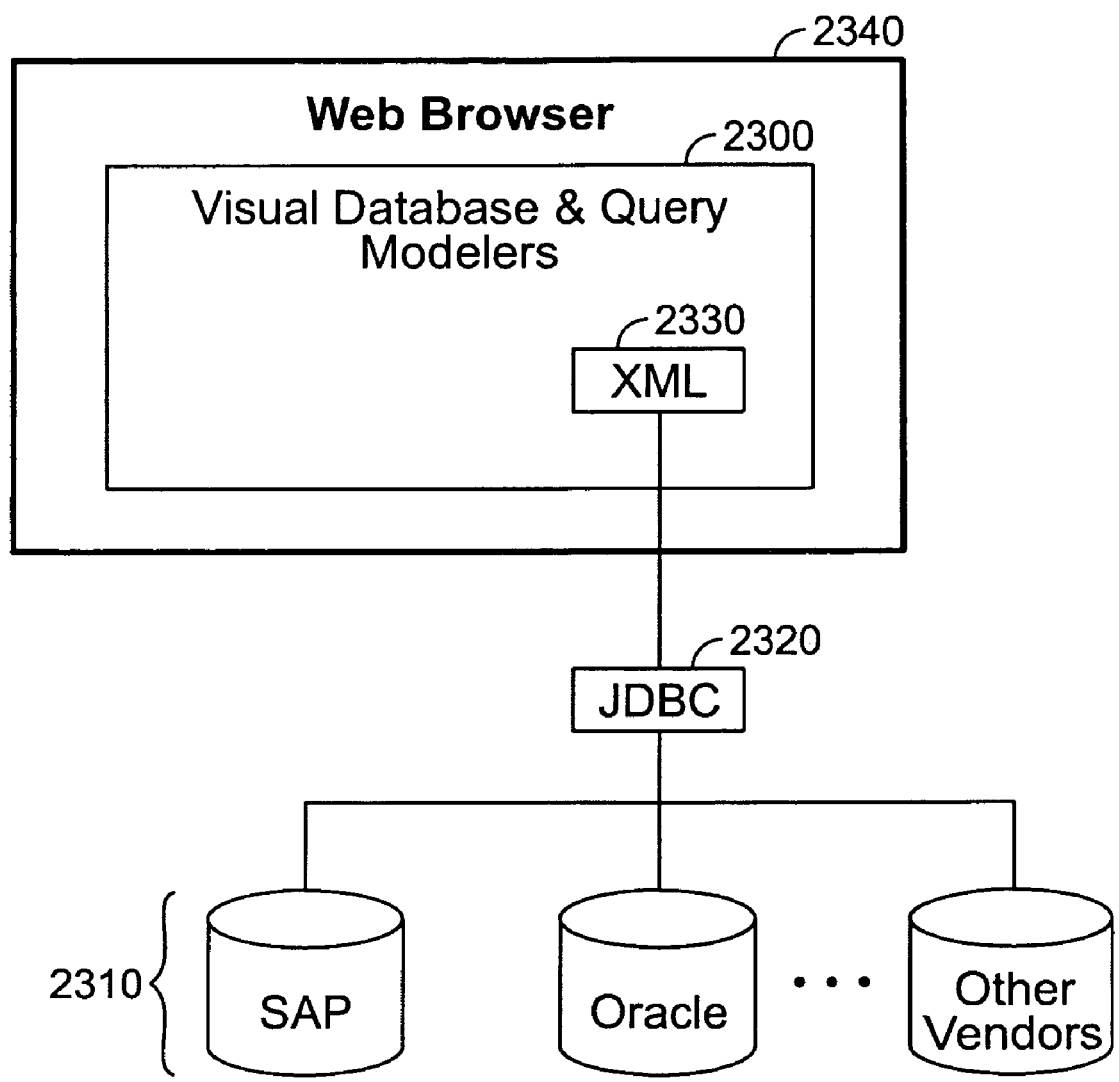
FIG. 23 illustrates one implementation of a visual database modeler and a visual query modeler.

In one implementation, as shown in FIG. 23, the visual database modeler and visual query modeler 2300 are universal tools that can be used with a variety of different types of databases 2310 from different database vendors. The modelers 2300 can communicate with the databases using a generic database connectivity protocol that is not specific to a particular database. Once such protocol is the JDBC (Java Database Connectivity) protocol 2320, available from Sun Microsystems, of Santa Clara, Calif. The retrieved data can be represented and stored in XML (extensible markup language) format 2330.

The visual database modeler and the visual query modeler can be accessed online, for example, through a web browser 2340. This enables the modelers to be used from any networked computer without installation of code for the modelers on the networked computer.

The visual database modeler and the visual query modeler can each be implemented as a component of the graphical configuration tool, as described above. Alternatively, the modelers can also be made available as separate stand-alone development tools.

Example Migration

FIGS. 24-29 illustrate an example migration using the above-described techniques and visual modeling tools.

Figure 24:
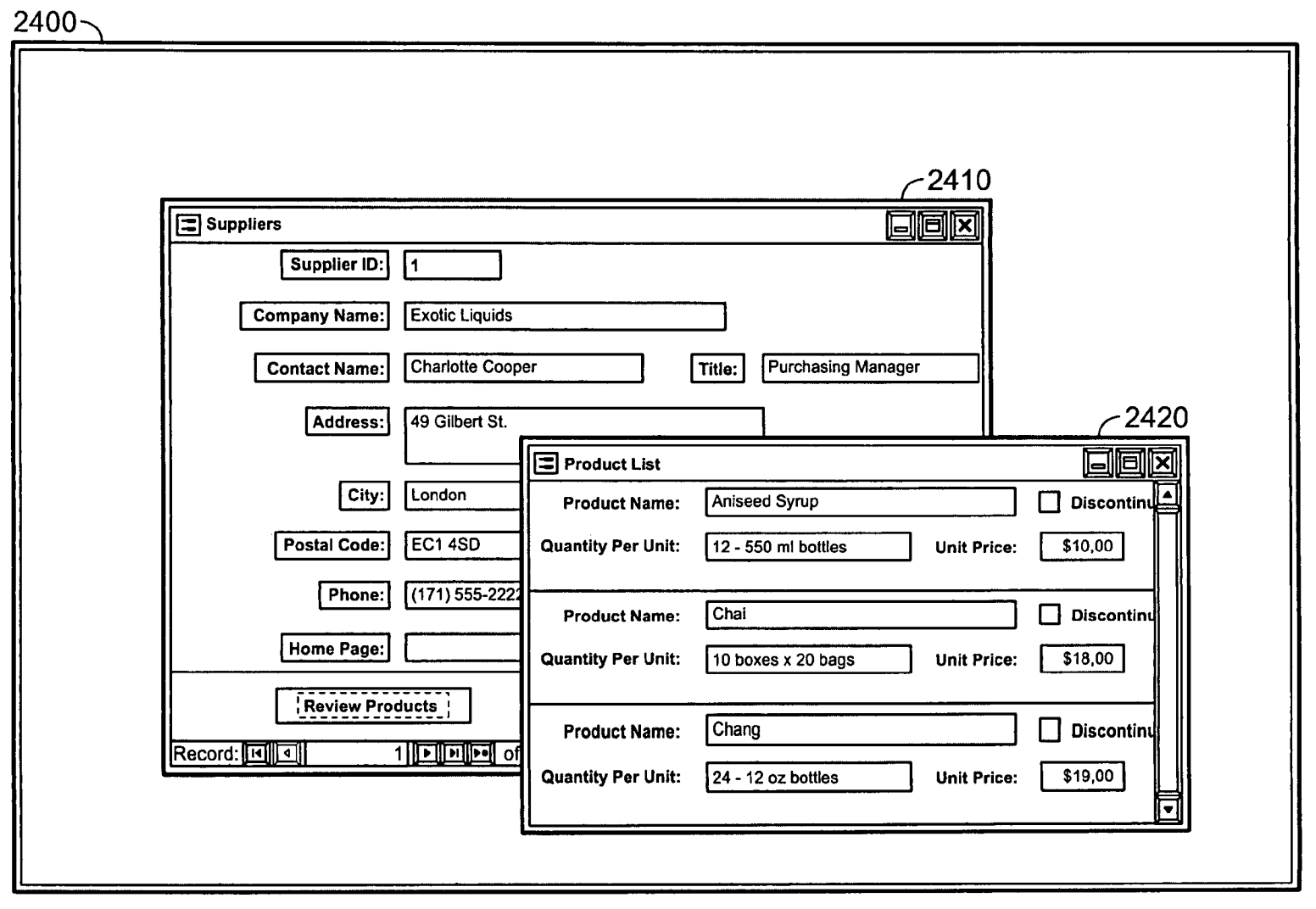

FIG. 24 shows an application 2400 to be migrated. As described above, a developer determines the functionality of the application to be migrated and then selects one or more patterns based on this determination. In this case, the application is used to search for products offered by a particular supplier (identified in a supplier input form 2410). The results of a product search is shown in a results window 2420.

Figure 25:
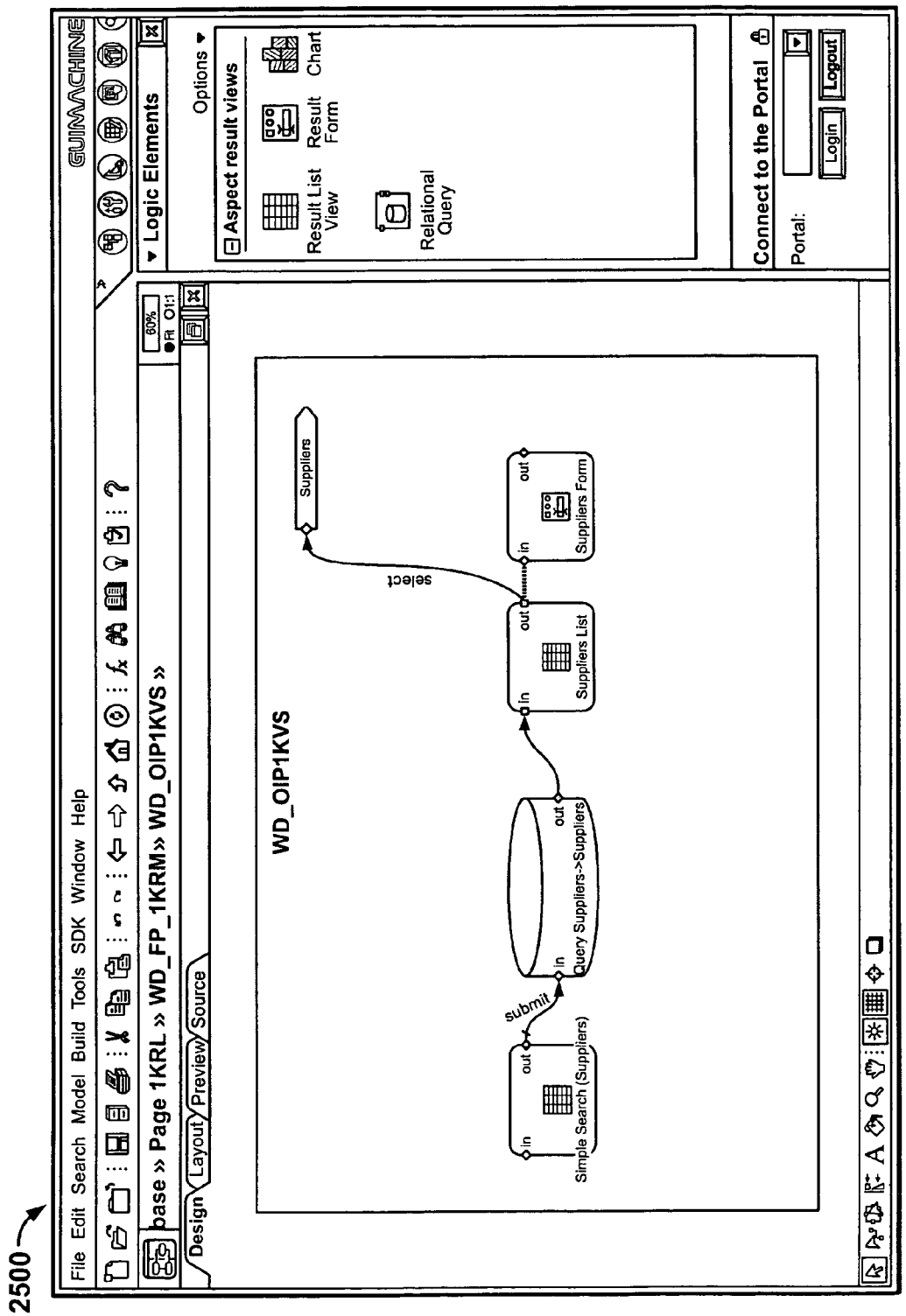

As shown in FIG. 25, the developer selects an OIP pattern 2500 using a graphical configuration tool. The developer will then configure the OIP pattern 2500 so that it provides the same or similar functionality as the application 2400. More specifically, the OIP pattern 2500 will be configured to execute a similar query into the application database, and to display similar results retrieved from the application database.

Figure 26:
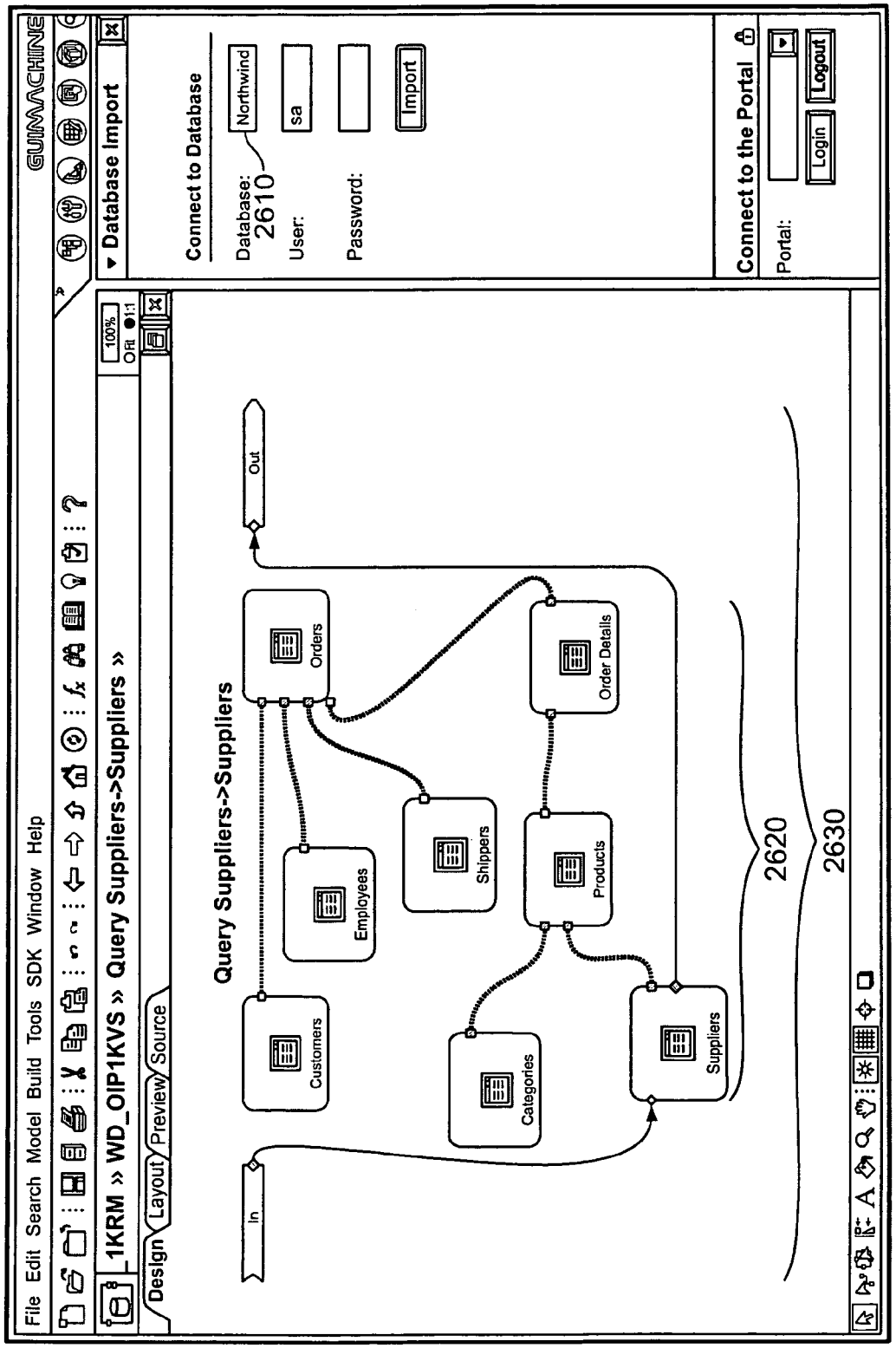

As shown in FIG. 26, the developer specifies a backend 2610 and imports a database structure from the specified backend. The graphical configuration tool displays a visual model 2620. The developer can then interact with the visual model to define a query 2630 based on the database structure. In this example, the developer has defined a query that searches the Suppliers table.

Figure 27:
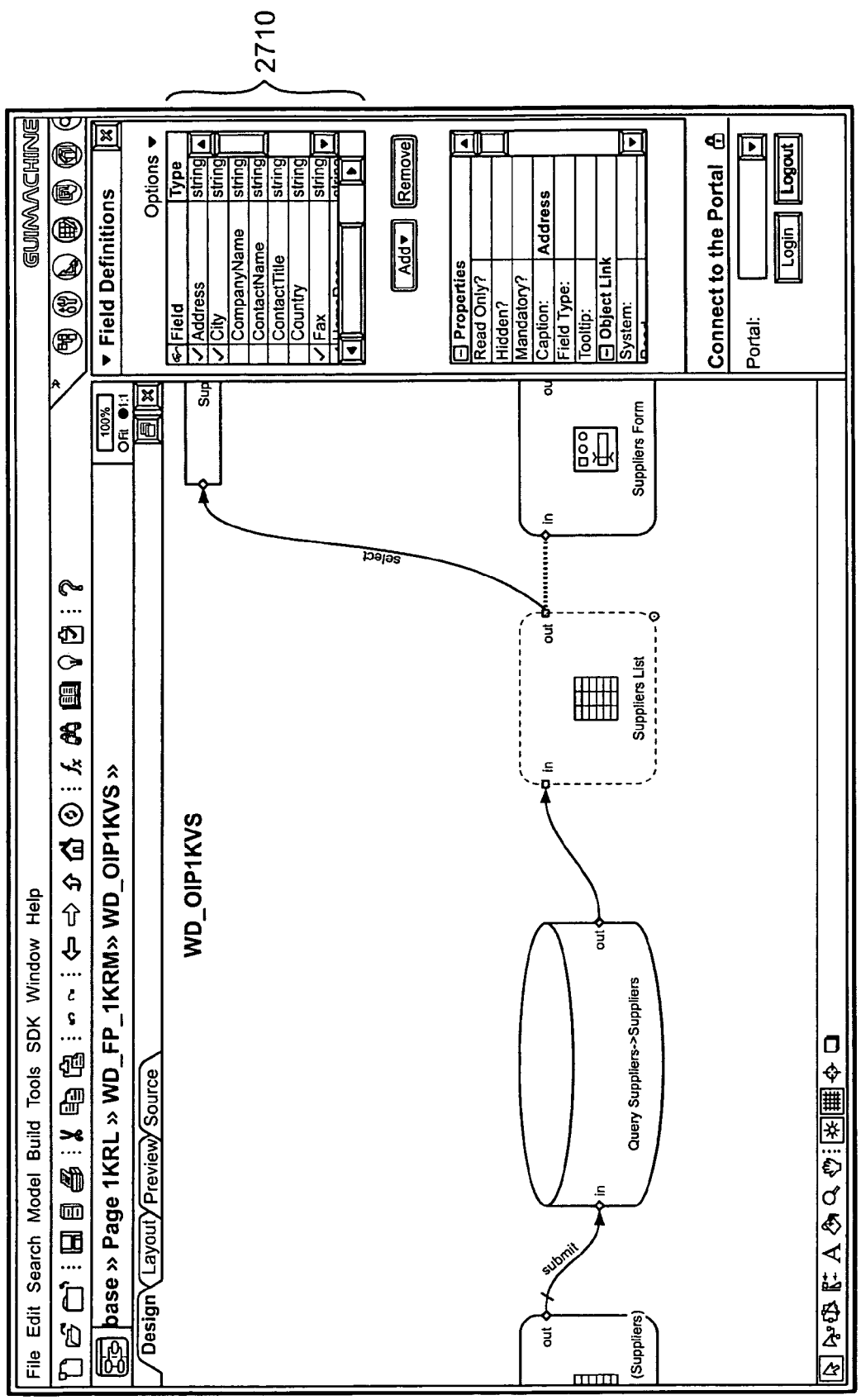

As shown in FIG. 27, the developer then defines the fields 2710 to be displayed in the OIP results list 2720. In this example, the selected fields include an address field, a city, field and a fax field.

Figure 28:
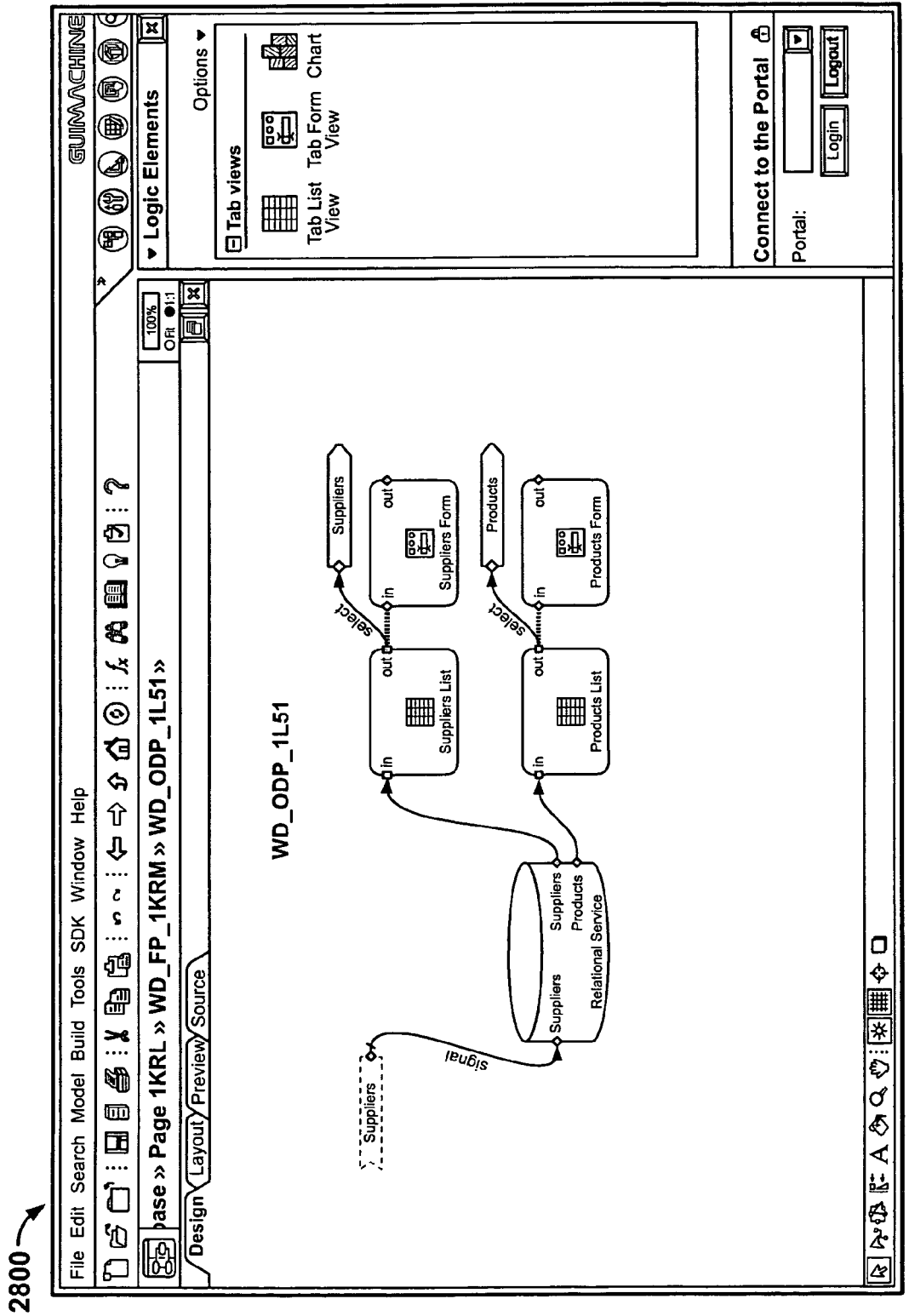

As shown in FIG. 28, the developer then selects another pattern, an ODP pattern 2800. The ODP pattern is used to show products corresponding to a supplier selected from a results list in the OIP pattern showing retrieved suppliers. The developer does not need to define queries for the ODP pattern because these are generated automatically. That is, the query to retrieve the products corresponding to a particular supplier is generated automatically when the output port of the OIP pattern (which represents a selected supplier) is linked to the input port of the ODP pattern. The query can be built automatically based on the predefined relationships between the supplier table and other tables in the application database model.

Figure 29:
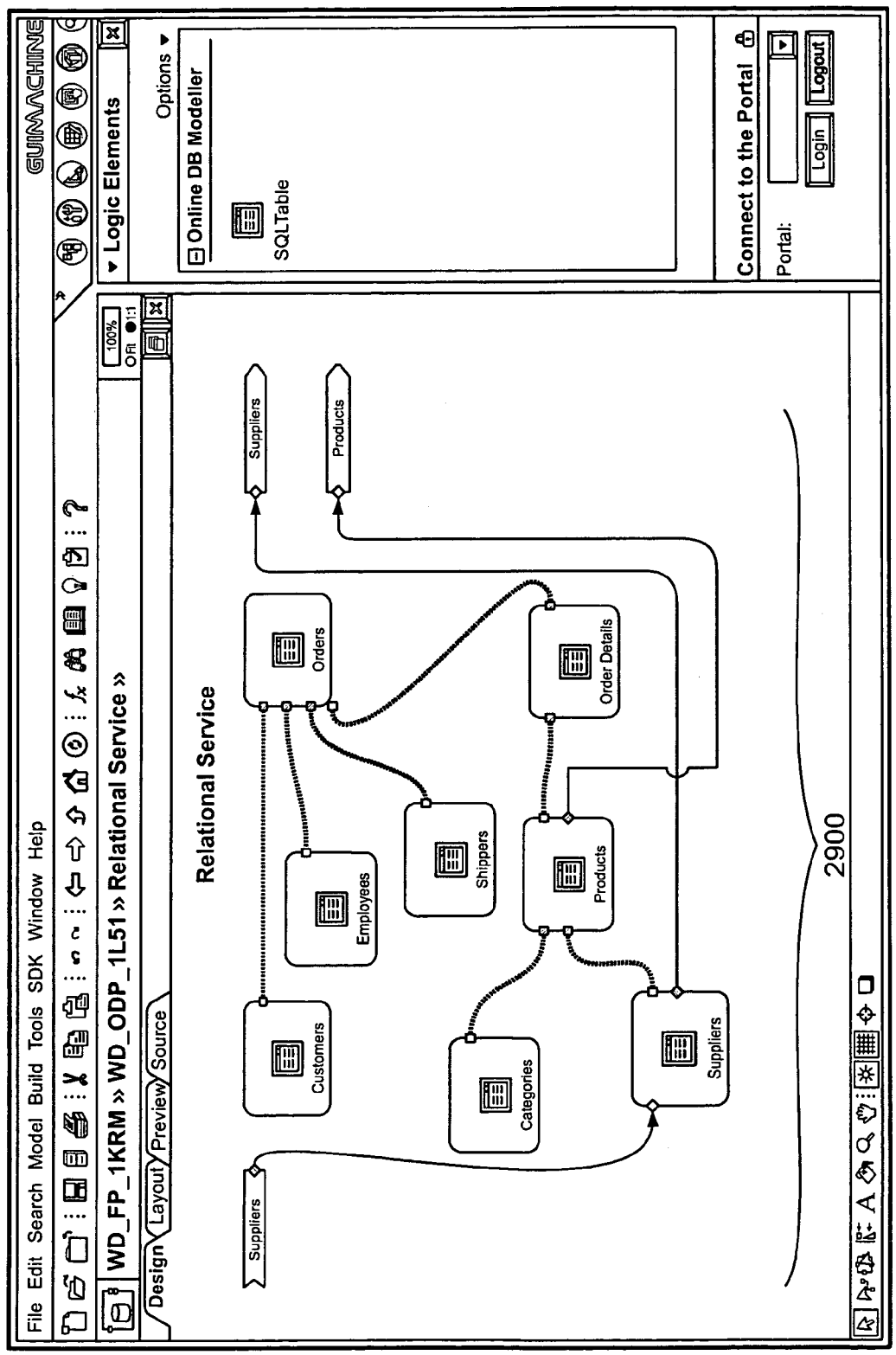
Figure 30:
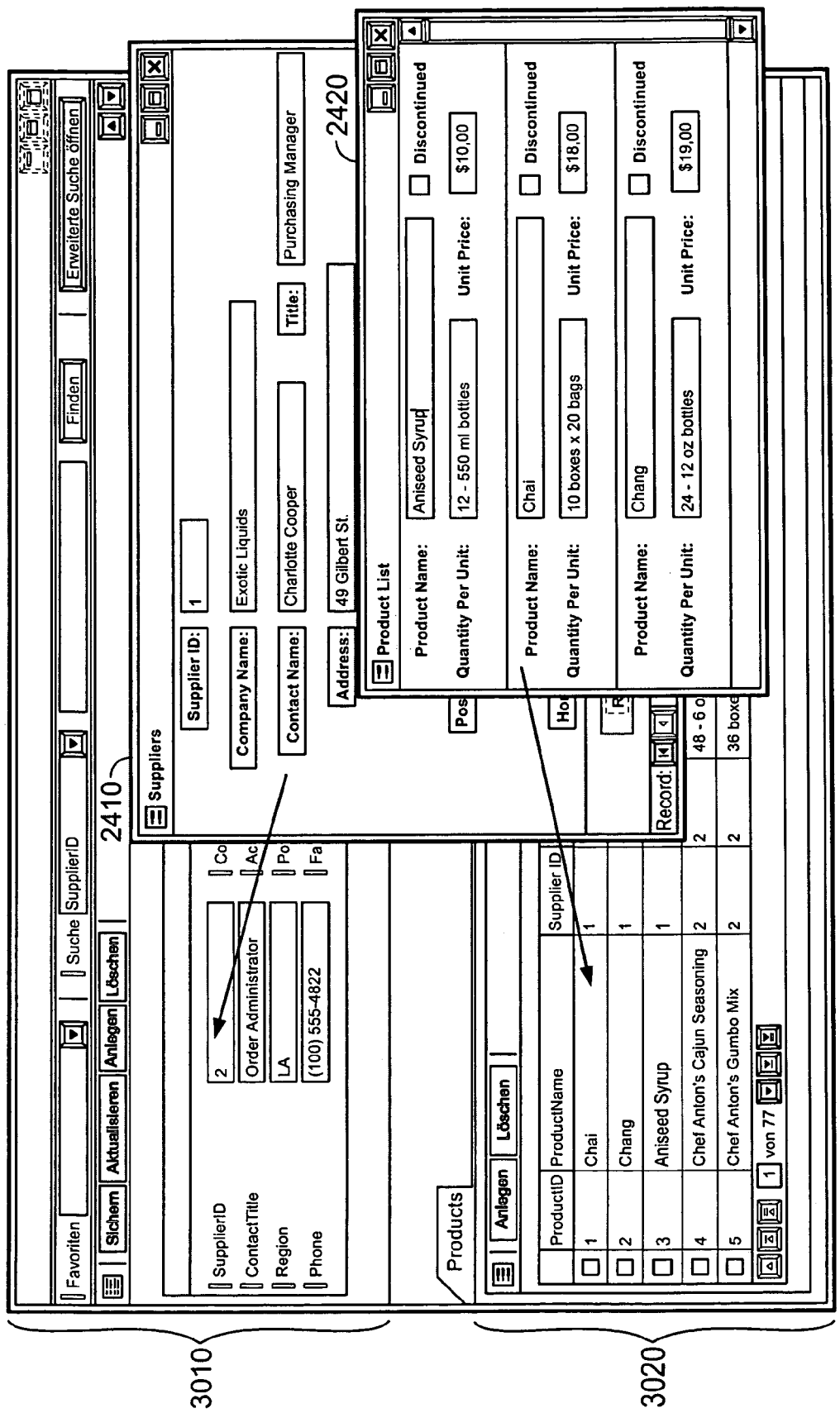

FIG. 29 shows the migrated application. The original supplier input form (i.e., the Suppliers window 2410) has now been replaced by the OIP pattern 2910, and the list of retrieved products (i.e., the Product List window 2420) has now been replaced by the ODP pattern 2920.

The above-described techniques can be implemented in digital electronic circuitry, in computer hardware, firmware, or software, or in combinations thereof. Particular implementations can be as a computer program product (i.e., a computer program tangibly embodied in an information carrier (e.g., in a machine-readable storage device or in a propagated signal)) for execution by, or to control the operation of, a data processing apparatus (e.g., a programmable processor, a computer, or multiple computers). A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers, at one site or distributed across multiple sites and interconnected by a communication network.

Method operations can be performed by one or more programmable processors executing a computer program to perform display functions of the invention by operating on input data and generating output. Method operations can also be performed by, and an apparatus can be implemented as, special purpose logic circuitry (e.g., an FPGA (field programmable gate array) or an ASIC (application-specific integrated circuit)). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory, a random access memory, or both. The essential elements of a computer are a processor for executing instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). Information carriers suitable for embodying computer program instructions and data include all forms of non-volatile memory, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in special purpose logic circuitry.

To provide for interaction with a user, the above described techniques can be implemented on a computer having a display device (e.g:, a CRT (cathode ray tube) or an LCD (liquid crystal display) monitor) for displaying information to the user and an input device (e.g., a keyboard and a pointing device (e.g., a mouse or a trackball)) by which the user can provide input to the computer (e.g., interact with a user interface element). Other kinds of devices can be used to provide for interaction with a user as well. For example, feedback provided to the user can be any form of sensory feedback (e.g., visual, auditory, or tactile), and input from the user can be received in any form, including acoustic, speech, or tactile input.

The above-described techniques can be implemented in a distributed computing system that includes a back-end component (e.g., a data server), a middleware component (e.g., an application server), and/or a front-end component (e.g., a client computer having a graphical user interface and/or a Web browser through which a user can interact with an example implementation). The components of the system can be interconnected by any form or medium of data communication (e.g., a communication network). Examples of communication networks include a local area network ("LAN") and a wide area network ("WAN") (e.g., the Internet), and include both wired and wireless networks.

The computing system can include clients and servers. A client and server are generally remote from each other and typically interact through a communication network. The relationship of client and server arises by virtue of computer programs running on the respective computers and having a client-server relationship to each other.

The invention has been described in terms of particular implementations, but other implementations can be achieved, and are within the scope of the following claims. For example, the operations of the invention can be performed in a different order and still achieve desirable results.

In certain implementations, multitasking and parallel processing may be preferable. As another example, although the use of UI patterns has been described in connection with business objects and business data, patterns can be used with other types of objects and with data that is not business-related.

Patterns can also be developed using different development processes in different development environments, and executed in different run-time systems. For example, patterns can be developed using an integrated development environment (IDE) that incorporates tools for building, testing, deploying, and maintaining applications (e.g., configuration applications and pattern components). Such tools can include visual development tools, templates (e.g., code templates), and class libraries. A class library can include base classes that provide basic functionality (e.g., input/output, string manipulation, and network communication), as well as specialized classes that provide enhanced functionality (e.g., classes for building and using graphical user interfaces on clients, and for offloading application functionality onto smart clients). Where an IDE supports multiple languages, class libraries can provide a consistent development interface across those languages.

In addition, some IDEs also provide services and functionality that can be used to reduce the amount of code that needs to be written manually. Such functionality can include, for example, the ability to declare and bind to data types and the ability to bind application elements such as controls and data structures.

IDEs can also provide code generation capabilities—for example, the ability to automatically generate plumbing code (e.g., code for drawing windows or accessing Web services), or the ability to automatically generate run-time code (e.g., by using code generators, compilers, or both). The automatic generation of run-time code allows programs to be targeted to multiple platforms. For example, a code generator can be used to automatically generate run-time code for one or more specific platforms based on the program code produced by a developer. Alternatively, the developer code can be compiled for a run-time system, which can be hosted in multiple environments (e.g., servers, clients, or a combination of servers and clients).

Some IDEs also provide the ability to create meta data that specifies descriptive information about an application, and that can be used by a run-time system to provide services to the application. Meta data can be explicitly declared by a developer, generated in the process of generating run-time code, or both.

Examples of IDEs that can be used to develop patterns include IDEs that are built using the open Eclipse Platform supported by the Eclipse Foundation (e.g., the Web Dynpro IDE developed by SAP, or the WebSphere Studio IDE developed by IBM Corp. of Armonk, N.Y.), as well as proprietary IDEs (e.g., the Visual Studio .NET IDE developed by Microsoft Corp. of Redmond, Wash.).

The overall process of developing a pattern (including, for example, developing a configuration application and a pattern component) can include a design time aspect and a run-time aspect. The design time aspect can involve use of the IDE to write code and to declare attributes, bindings, and other meta data. The code and the meta data can then be used to generate run-time code to be executed in a run-time system. Some development environments can be coupled to a corresponding run-time system, which allows programs developed in such development environments to take advantage of services offered by the corresponding run-time systems. For example, in the Web Dynpro environment discussed in conjunction with FIG. 5, applications can take advantage of services such as input help and validation offered by the Web Dynpro runtime, which frees developers from having to code such functionality manually into their programs.

Run-time systems provide a code execution environment that generally includes core services (e.g., memory, process, and session management), as well as enhanced services (e.g., input help and validation). In addition to the Web Dynpro runtime, other examples of run-time systems include virtual machines (e.g., the Java Virtual Machine), and the Common Language Runtime (a run-time system developed by Microsoft Corp.) As specified above, run-time systems can be hosted in multiple environments, including servers and clients. Servers generally provide a core operating environment for applications (e.g., by providing a run-time system in which the applications can execute). An example of a server is a J2EE-compliant server, such as the Web Application Server from SAP or the WebSphere Application Server from IBM Corp.

What is claimed is:

1. A computer program product, tangibly embodied in a machine-readable storage device, the computer program product being operable to cause a data processing apparatus to perform operations comprising:

displaying in a web browser a visual model of a database, the visual model including one or more graphical objects representing one or more tables in the database and relations between the tables;

receiving in the web browser user input creating a visual model of a query into the database;

generating code for the query based on the visual model of the query;

incorporating the query into a pattern-based application, the pattern-based application being an application that is developed by selecting a pattern from a set of patterns and configuring the pattern to perform application-specific functionality, the pattern comprising multiple pattern elements including prearranged user interface elements, the pattern specifying predefined actions that can be performed using the user interface elements; and automatically generating one or more additional queries based on a first selected pattern once the first selected pattern is linked to a second selected pattern.

2. The product of claim 1, wherein the code is SQL (Structured Query Language) code.

3. The product of claim 1, wherein the user input creating a visual model of a query includes input specifying a query structure, query inputs and query outputs.

4. The product of claim 1, wherein
incorporating the query into a pattern-based application includes configuring the pattern to use the query.

5. The product of claim 4, wherein:
the query takes as input one or more input fields and produces as a output one or more output fields; and
configuring the pattern to use the query includes selecting which input fields and output fields to be displayed by the pattern.

6. The product of claim 4, wherein configuring the pattern to use the query includes adapting the query to include one or more additional output fields selected based on the relations in the database.

7. The product of claim 4, wherein configuring the pattern to use the query includes configuring the pattern to perform one or more data operations on the output of the query.

8. A method comprising:
displaying in a web browser a visual model of a database, the visual model including one or more graphical objects representing one or more tables in the database and relations between the tables;

receiving in the web browser user input creating a visual model of a query into the database;

generating code for the query based on the visual model of the query;

incorporating the query into a pattern-based application, the pattern-based application being an application that is developed by selecting a pattern from a set of patterns and configuring the pattern to perform application-specific functionality, the pattern comprising multiple pattern elements including prearranged user interface elements, the pattern specifying predefined actions that can be performed using the user interface elements; and automatically generating one or more additional queries based on a first selected pattern once the first selected pattern is linked to a second selected pattern.

9. The method of claim 8, wherein the code is SQL (Structured Query Language) code.

10. The method of claim 8, wherein the user input creating a visual model of a query includes input specifying a query structure, query inputs and query outputs.

11. The method of claim 8, wherein
incorporating the query into a pattern-based application includes configuring the pattern to use the query.

12. The method of claim 11, wherein:
the query takes as input one or more input fields and produces as a output one or more output fields; and
configuring the pattern to use the query includes selecting which input fields and output fields to be displayed by the pattern.

13. The method of claim 11, wherein configuring the pattern to use the query includes adapting the query to include one or more additional output fields selected based on the relations in the database.

14. The method of claim 11, wherein configuring the pattern to use the query includes configuring the pattern to perform one or more data operations on the output of the query.

15. Apparatus comprising:
means for displaying in a web browser a visual model of a database, the visual model including one or more graphical objects representing one or more tables in the database and relations between the tables;

means for receiving in the web browser user input creating a visual model of a query into the database;

means for generating code for the query based on the visual model of the query;

means for incorporating the query into a pattern-based application, the pattern-based application being an application that is developed by selecting a pattern from a set of patterns and configuring the pattern to perform application-specific functionality, the pattern comprising multiple pattern elements including prearranged user interface elements, the pattern specifying predefined actions that can be performed using the user interface elements; and means for automatically generating one or more additional queries based on a first selected pattern once the first selected pattern is linked to a second selected pattern.

* * * * *